United States Patent [19]

Schäfer et al.

[11] Patent Number: 5,342,566

[45] Date of Patent: Aug. 30, 1994

[54] METHOD OF MANUFACTURING FIBER GYPSUM BOARD

[75] Inventors: Karl K. Schäfer, Gengenbach; Gerhard M. Melzer, Lautertal; Jörg Scriba, Ortenberg, all of Fed. Rep. of Germany; Suda G. Bhagwat, Double Oak, Tex.; James Eisses, Coeus D'Alene, Id.

[73] Assignees: Carl Schenck AG, Darmstadt, Fed. Rep. of Germany; Lousiana Pacific Corporation, Portland, Oreg.

[21] Appl. No.: 572,758

[22] Filed: Aug. 23, 1990

[51] Int. Cl.$^5$ .................. B28B 1/52; B28C 5/40; B32B 31/20

[52] U.S. Cl. .................. 264/102; 106/711; 106/780; 106/783; 156/42; 269/113; 269/115; 269/120; 269/333; 427/403

[58] Field of Search ............... 156/39, 42, 45; 106/697, 711, 778, 779, 780, 783; 264/102, 109, 113, 115, 116, 120, 122, 333; 427/351, 403

[56] References Cited

U.S. PATENT DOCUMENTS

| | | | |
|---|---|---|---|
| 135,582 | 2/1873 | Pfund | 106/780 |
| 1,463,123 | 7/1923 | McAllister | 106/780 |
| 1,608,562 | 11/1926 | Melandri | 106/795 |
| 1,702,966 | 2/1929 | Haggerty | 106/780 |
| 1,859,853 | 5/1932 | Thomson | 156/346 |
| 1,932,956 | 2/1933 | Crandell et al. | 154/2 |
| 2,125,046 | 7/1938 | Crandell | 83/73 |
| 2,301,597 | 11/1942 | Weltz et al. | 106/780 |
| 2,310,023 | 2/1943 | Gardner | 106/779 |
| 2,705,198 | 3/1955 | Seybold | 92/3 |
| 2,731,337 | 1/1956 | Riddell | 71/2.4 |
| 2,760,885 | 8/1956 | Larsen | 117/70 |
| 2,803,575 | 8/1957 | Riddell et al. | 154/88 |
| 3,106,500 | 10/1963 | Turner | 156/91 |
| 3,271,492 | 9/1966 | Elmendorf | 264/122 |
| 3,290,018 | 8/1965 | Stapelfeldt | 259/146 |
| 3,414,462 | 12/1966 | Cafferata | 161/166 |
| 3,462,339 | 8/1969 | Poms . | |
| 3,592,670 | 7/1971 | Kossuth et al. | 106/110 |
| 3,616,173 | 10/1971 | Green et al. | 161/162 |
| 3,737,265 | 6/1973 | Schafer et al. | 425/140 |
| 3,770,468 | 11/1973 | Knauf et al. | 106/110 |
| 3,809,566 | 5/1974 | Revord | 106/110 |
| 3,872,204 | 3/1975 | Yano et al. | 264/102 |
| 3,944,698 | 3/1976 | Dierks et al. | 156/42 |

(List continued on next page.)

FOREIGN PATENT DOCUMENTS

| | | |
|---|---|---|
| 268967 | 2/1969 | Austria . |
| 360901 | 2/1981 | Austria . |
| 1261125 | 9/1989 | Canada . |
| 0019207 | 11/1980 | European Pat. Off. . |
| 0143939 | 6/1985 | European Pat. Off. . |
| 1784657 | 8/1971 | Fed. Rep. of Germany . |
| 2229147 | 1/1974 | Fed. Rep. of Germany . |
| 2257827 | 6/1974 | Fed. Rep. of Germany . |
| 2808423 | 9/1978 | Fed. Rep. of Germany . |
| 2919311 | 9/1980 | Fed. Rep. of Germany . |
| 3404658 | 8/1985 | Fed. Rep. of Germany . |
| 3439493 | 5/1986 | Fed. Rep. of Germany . |

(List continued on the next page.)

OTHER PUBLICATIONS

Bulleting of the Federal Research Institute for Forestry and Wood, Jan. 1979, No. 124.

Louisiana–Pacific, "The wallboard of the future has
(List continued on the next page.)

Primary Examiner—Michael W. Ball
Assistant Examiner—Steven D. Maki
Attorney, Agent, or Firm—Felfe & Lynch

[57] ABSTRACT

A method and apparatus for producing gypsum board. The method includes the steps of mixing a predetermined amount of fibers, absorbent, and water to form a mixture of wetted, loose fibers, mixing the wetted fibers with predetermined amount of dry calcined gypsum, forming the mixture into a matt having a substantially uniform consistency and compressing the matt to form a board composed of bonded fibers and gypsum. The resulting board has a smooth exterior and can be a homogeneous or a multilayer board.

72 Claims, 19 Drawing Sheets

U.S. PATENT DOCUMENTS

| | | | |
|---|---|---|---|
| 3,951,735 | 4/1976 | Kondo et al. | 264/113 |
| 4,060,580 | 11/1977 | Pampel | 264/109 |
| 4,117,070 | 9/1978 | O'Neill | 156/39 |
| 4,146,564 | 3/1979 | Garrick et al. | 264/113 |
| 4,195,110 | 3/1980 | Dierks et al. | 156/42 |
| 4,233,368 | 11/1980 | Baehr et al. | 264/121 |
| 4,265,979 | 5/1981 | Baehr et al. | 156/39 |
| 4,328,178 | 5/1982 | Kossatz | 264/333 |
| 4,340,521 | 7/1982 | Deleuil | 106/109 |
| 4,645,548 | 2/1987 | Take et al. | 156/39 |
| 4,680,907 | 7/1987 | Williams | 52/309.17 |
| 4,722,866 | 2/1988 | Wilson et al. | 106/15.05 |
| 4,942,003 | 7/1990 | Bold | 156/39 |

FOREIGN PATENT DOCUMENTS

| | | | |
|---|---|---|---|
| 3822759 | 1/1990 | Fed. Rep. of Germany | 264/333 |
| 173986 | 2/1980 | Hungary . | |
| 5247814 | 10/1975 | Japan . | |
| 26904 | 6/1987 | Japan | 264/333 |
| 81561 | 5/1956 | Netherlands . | |
| 596403 | 3/1928 | Switzerland . | |
| 606987 | 5/1978 | U.S.S.R. | 264/333 |
| 463108 | 3/1937 | United Kingdom . | |
| 772581 | 4/1957 | United Kingdom . | |

OTHER PUBLICATIONS arrived", 1-O-P/AD 12M Apr. 1990, dated Apr. 20, 1990.

Louisiana–Pacific, "Introducing FiberBond The closest distance yet", undated.

Schenck (believed to be published Apr., 1989).

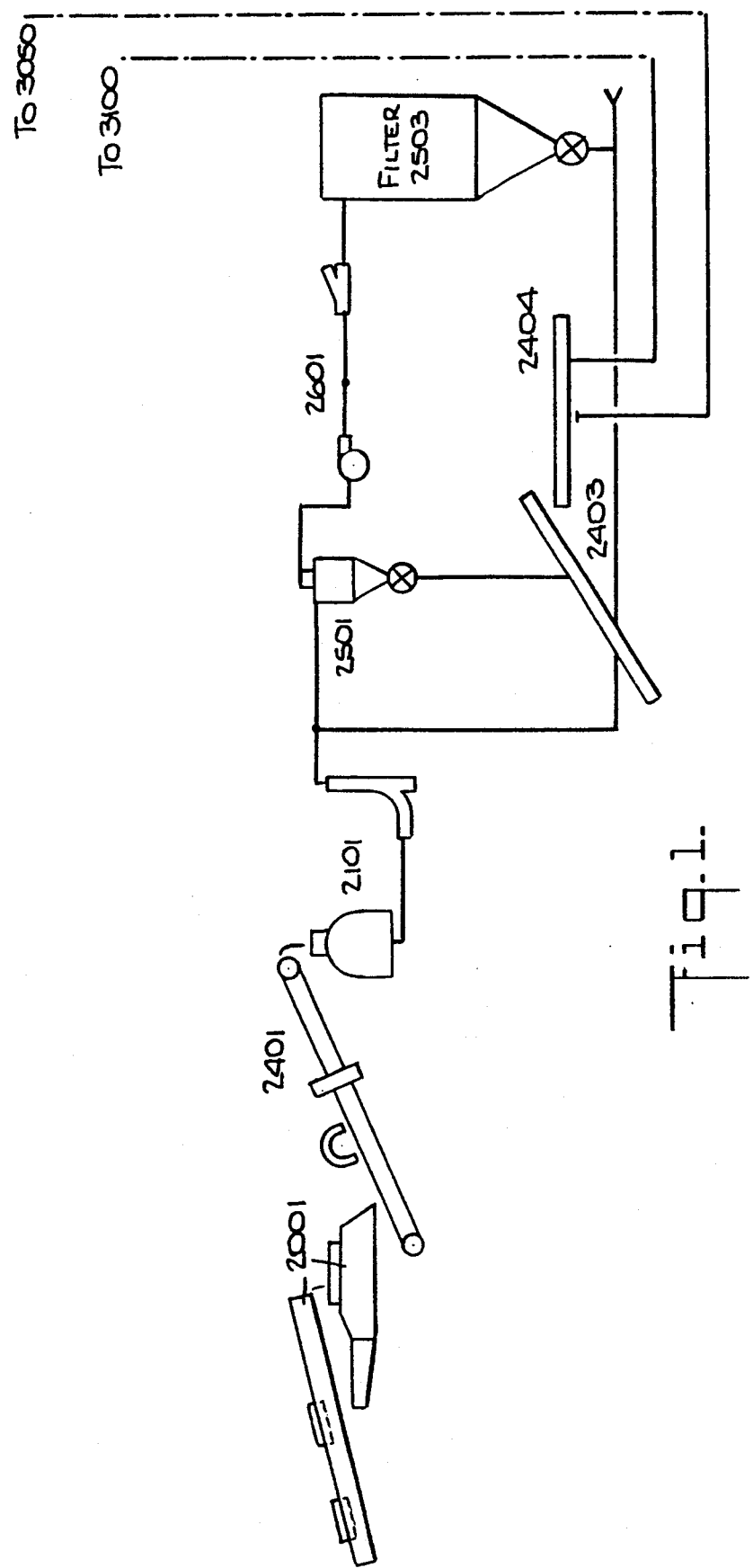

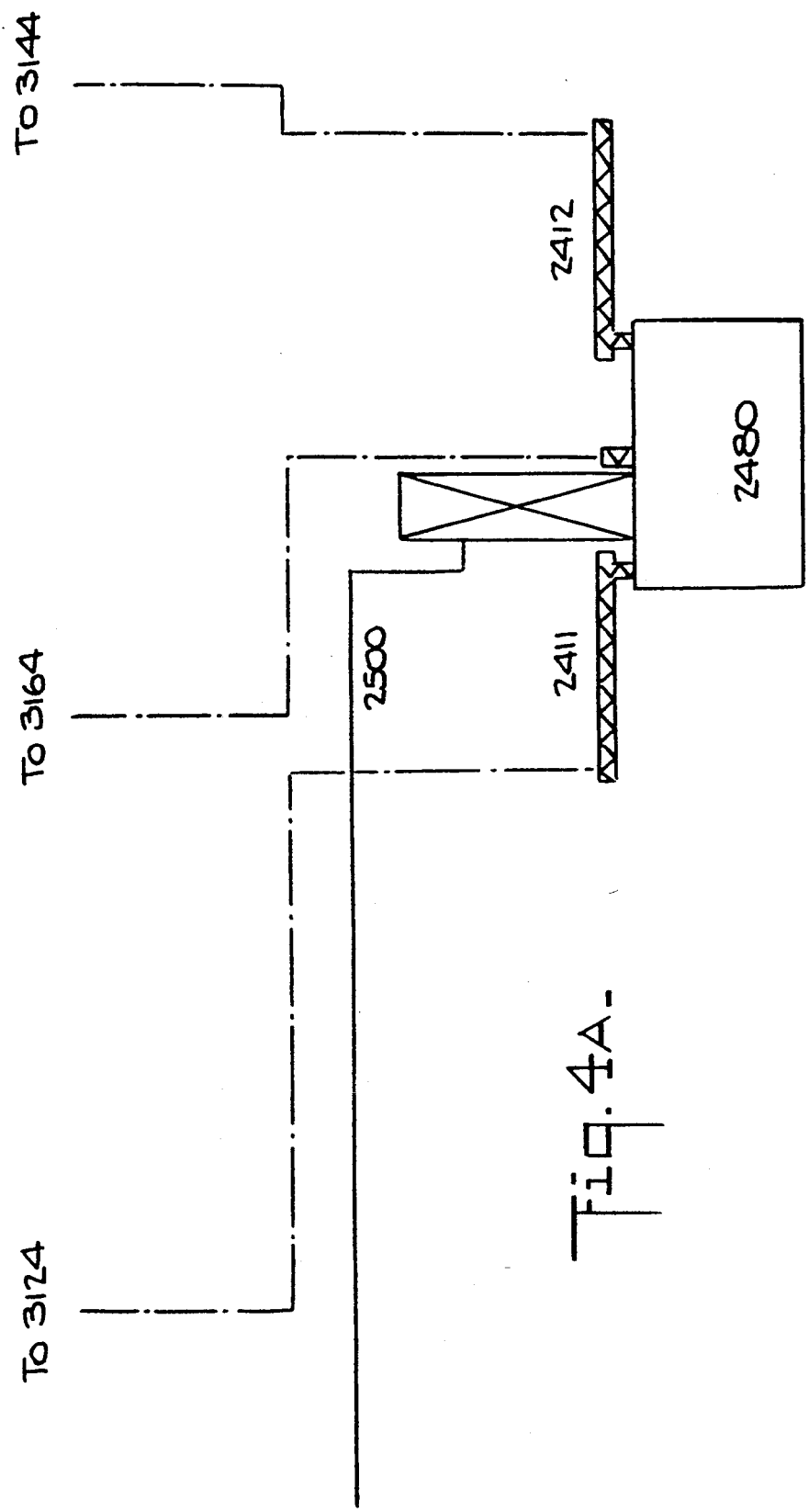

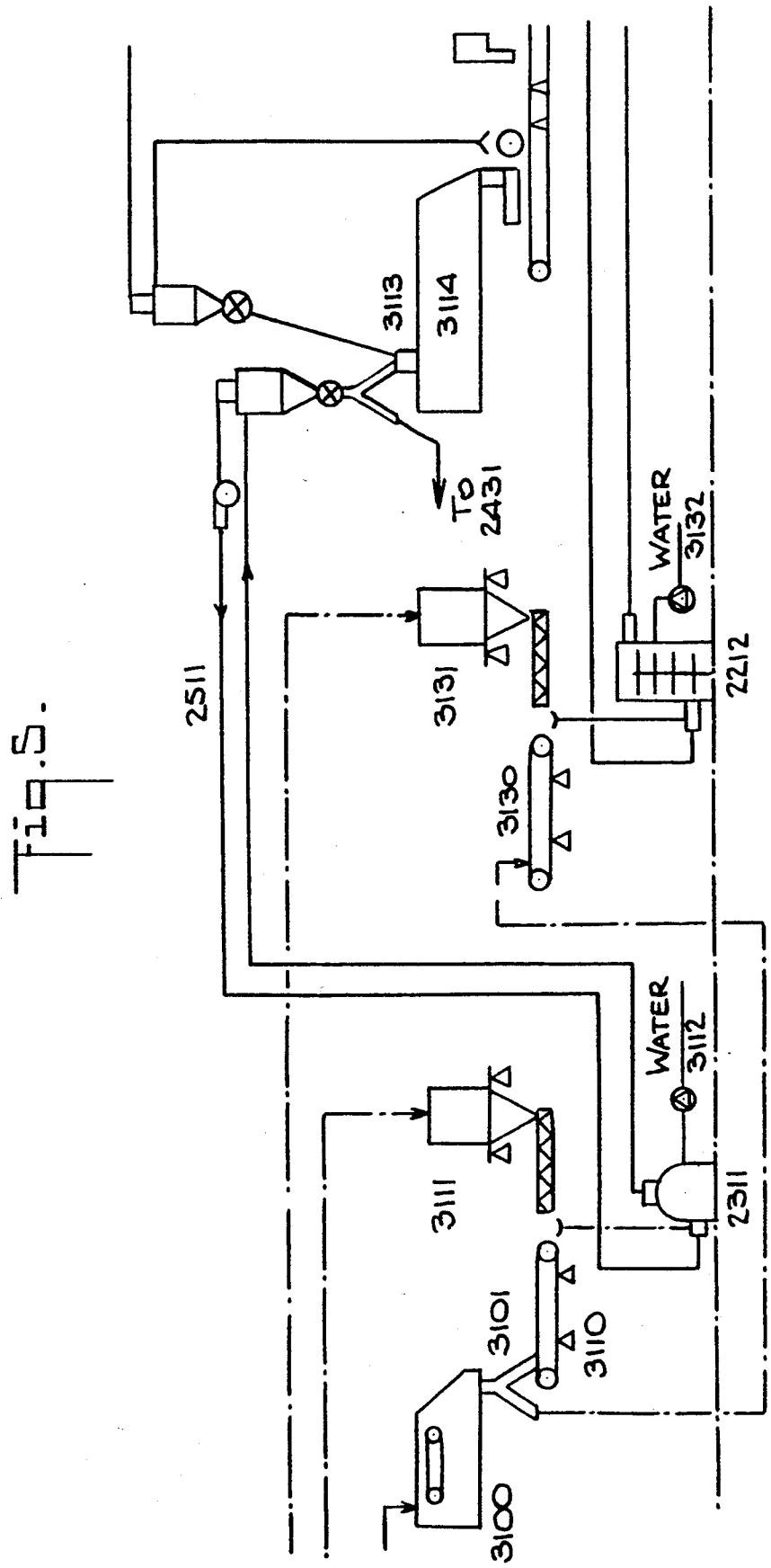

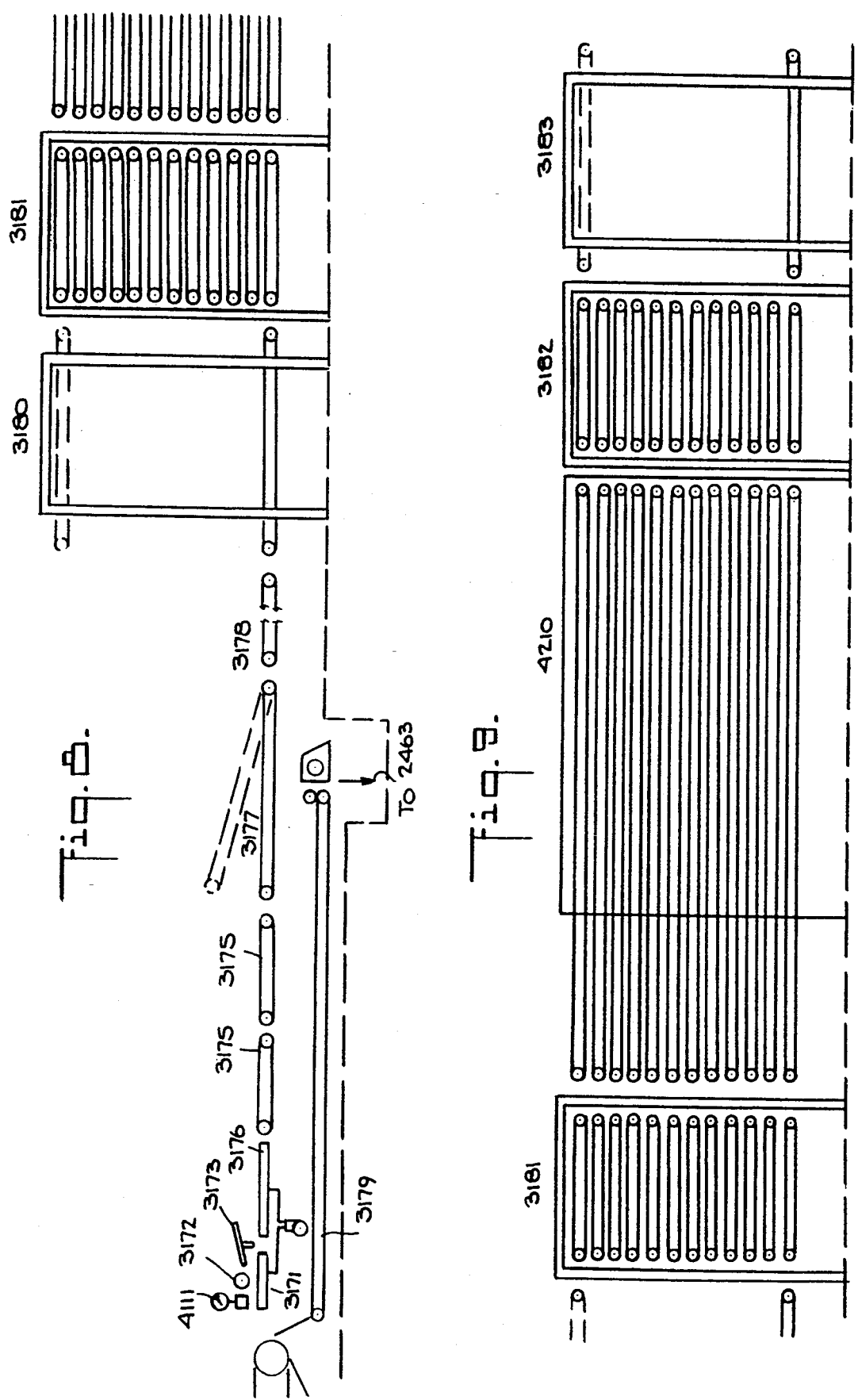

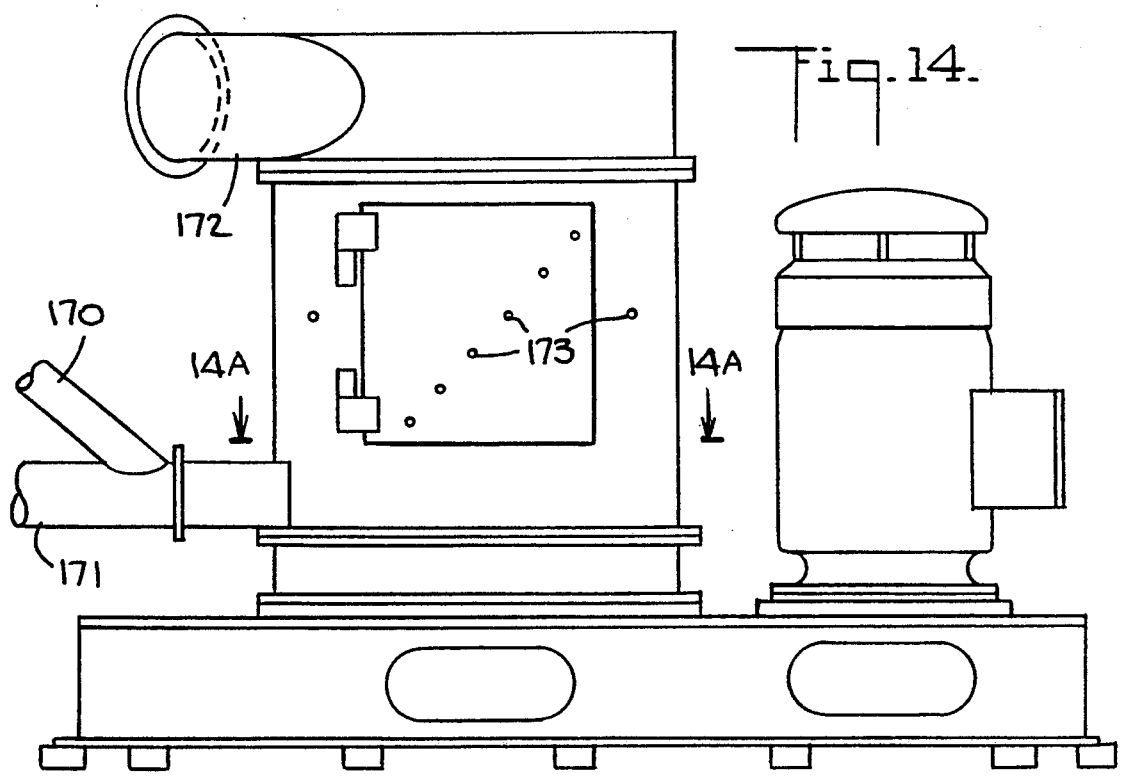
Fig. 14.
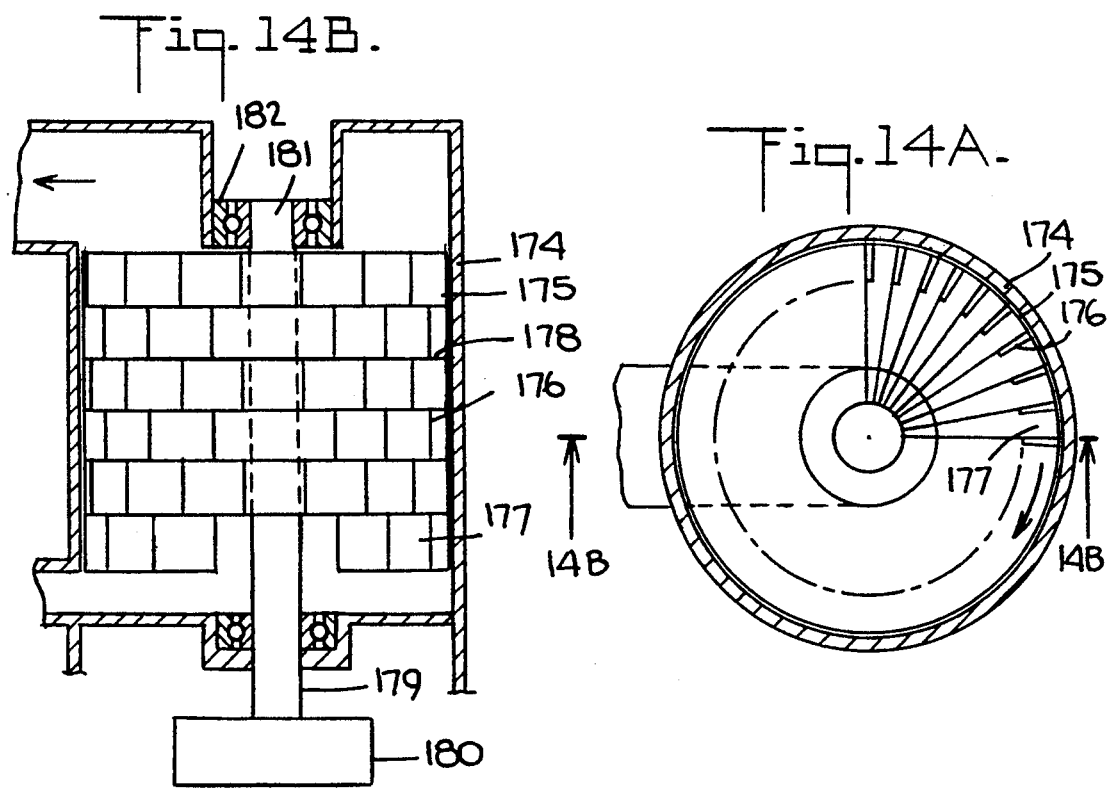
Fig. 14B.
Fig. 14A.

METHOD OF MANUFACTURING FIBER GYPSUM BOARD

BACKGROUND OF THE INVENTION

1. Field of The Invention

The present invention relates to fiber gypsum board (FGB) and composites and the method of manufacturing the same for use as building materials. More particularly, the invention is directed toward a fiber gypsum board and composites that can have a more variable density, and have greater strength. The invention further relates to novel methods, systems, and apparatus for manufacturing FGB and composites.

2. Description of Prior Art

It is well-known that conventional gypsum wallboard is typically manufactured from a plaster slurry which is put between two layers of paper.

In the conventional method, a wet slurry of gypsum is poured between two layers of paper and the slurry is allowed a certain amount of time to set up. In gypsum wallboard, the two layers of paper contain the slurry and provide the strength required in installation and use. The wallboard is cut into discrete lengths to accommodate subsequent handling and then dried in heated dryers until the board is completely dry.

The bending strength of the board depends on the tensile strength of the paper; while the gypsum serves as a "spacer" and accounts for fire resistance and moisture absorbing and moisture releasing activities. The static properties are limited, and the surface treatment and the joint filler system are determined by the paper.

There have been some efforts to arrive at a process for making gypsum fiber board by a slurry process. There are examples of dry and semi-dry processes disclosed in U.S. Pat. Nos. 3,737,265 to Schafer et al.; 4,328,178 to Kossatz; and U.S. Pat. No. 3,233,368 to Baehr et al.

Prior art processes which involve the moistening of mixed fibers and plaster have presented significant limitations and problems. The mixture of the fibers with water often results in the creation of clumps or balls of wetted fibers that are stuck to each other. Such balled fibers do not mix well with the gypsum and significantly reduce the strength of the resultant board and produce uneven and rough surfaces. To the inventors' knowledge, ball-free moistening and subsequent mixing of the moistened fibers, such as waste paper fibers, with plaster has so far not been commercially acceptable. Fire regulations often require a low fiber percentage in the finished board. As this percentage decreases, however, the moisture content which has to be applied to the fibers increases, thereby amplifying the balling effect. For example, to provide a board with the proper strength, a board having a fiber percentage of 22% of the finished board requires 150% by weight of water to 100% fibers, if the fibers are to carry the water for setting the plaster. In the prior art processes, such a high ratio of water to fiber results in balling.

SUMMARY OF THE INVENTION

It is an object of the invention to provide a fiber gypsum board that is lighter, stronger and fire resistant and has a smooth surface which does not require sanding.

It is further an object of the present invention to provide a method of manufacturing fiber gypsum boards and composites which is more economical and more broadly adaptable than conventional processes.

Yet another object is to present a semi-dry process for producing gypsum fiber board in which all or part of the setting water is incorporated by fiber moistening.

Another object is to provide a process which can produce gypsum fiber board having either a single homogeneous layer or multiple heterogeneous layers.

Yet another object is to provide a process and system which can produce gypsum fiber board from available waste products such as presorted waste paper, used newspaper, inexpensive collected household waste paper, reject fibers of pulp production, waste wood fibers, natural gypsum, chemical gypsum and FGD (fluid gas desulphurization) gypsum.

Still another object is to provide equipment and a manufacturing line which can efficiently and economically produce gypsum fiber boards having different, preselected properties.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method of producing gypsum board, the method including the steps of mixing in a preliminary mixing step a predetermined amount of fibers, an absorbent restricting the adhesion of the fibers to one another, and water to form a mixture of wetted, loose fibers; mixing in a final mixing step the wetted fibers with a predetermined amount of dry calcined gypsum; laying the mixed composition into a matt having a substantially uniform consistency; compressing the matt to form a board composed of bonded fibers and gypsum; and drying the board after complete setting of the gypsum to provide a finished board.

The fibers can be, for example, recycled paper fibers or reject fibers of pulp production, wood fibers or mixtures thereof with various mineral fibers that are capable of serving as a water carrier. The absorbent in the preferred embodiment is powdered quick lime. In the preferred embodiment, one or more vertical mixers are used to mix the fibers with dry calcined gypsum or with dry calcined gypsum and additives, and the resultant homogeneous mixture is then placed onto a conveyor belt or similar surface to form a moving matt. Additives can be added to strengthen the board, speed the setting and hydration process, or provide other desired characteristics. These additives can be metered into the other ingredients by mixing screws, pinwheels, liquid nozzles or similar mixing devices located at various locations along the production line, thereby providing improved control.

To achieve the object and in accordance with the purpose of the invention, as embodied and broadly described herein, the invention further comprises a method of producing fiber gypsum board comprising the steps of mixing in a preliminary mixing step predetermined amounts of fibers and water respectively, to form a mixture of wetted, loose fibers; mixing in a mixing step the wetted fibers with a predetermined amount of dry calcined gypsum; premixing an accelerator with one of the components of dry calcined gypsum, fiber and water; promptly laying the mixed composition into a matt; immediately degassing the matt in a first compression step, adding a predetermined amount of water onto the resultant matt; and immediately compressing the matt to form a board composed of bonded fibers and gypsum.

In this method, less than the amount of water needed to hydrate the gypsum to optimum strength is added to the fibers in the preliminary mixing step, thereby minimizing the tendency of the fibers to ball. An absorbent is preferably added to the fibers before or while they are mixed with water. The amount of water needed to hydrate the gypsum to optimum strength is added to the board after the mixture of wetted fibers and gypsum are mixed. The step preferably occurs while or after the matt of the mixture is degassed. The added water is then sucked into the degassed mixture of wetted fibers and gypsum and distributed throughout much, if not all, of the board. The added water can have an accelerator which allows the board to set in an extremely short time. The resultant board has an excellent distribution of fibers and gypsum—and is extremely strong.

The invention also comprises systems and apparatus for practicing the methods, and gypsum boards made according to the above methods or combination of these methods. The invention thus comprises a gypsum board made of bonded fibers and gypsum and having no exterior paper coating. The invention also comprises multilayered gypsum boards, such as a board having a lightweight inner layer.

It is to be understood that the foregoing general description, and the following detailed description, are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is an illustration of a paper preparation area of a production line made according to the present invention.

FIG. 4A is an illustration of the plaster distribution bin of the invention.

FIG. 5 is an illustration of a wetted fiber and surface layer preparation area of a production line made according to the present invention.

FIG. 8 is an illustration of a cutting and dryer preparation area of a production line made according to the present invention.

FIG. 9 is a drying area of a production line made according to the present invention.

FIG. 14 is a side view, and FIGS. 14A and 14B are schematic partial cutaways, of a turbo mill for dissolving and wetting fibers according to the present invention.

FIGS. 16A, 16-A1 and 16-2 are side views of a vertical mixer and the designs of the mixing and cleaning disks respectively.

DETAILED DESCRIPTION OF THE INVENTION

Figure 1A:
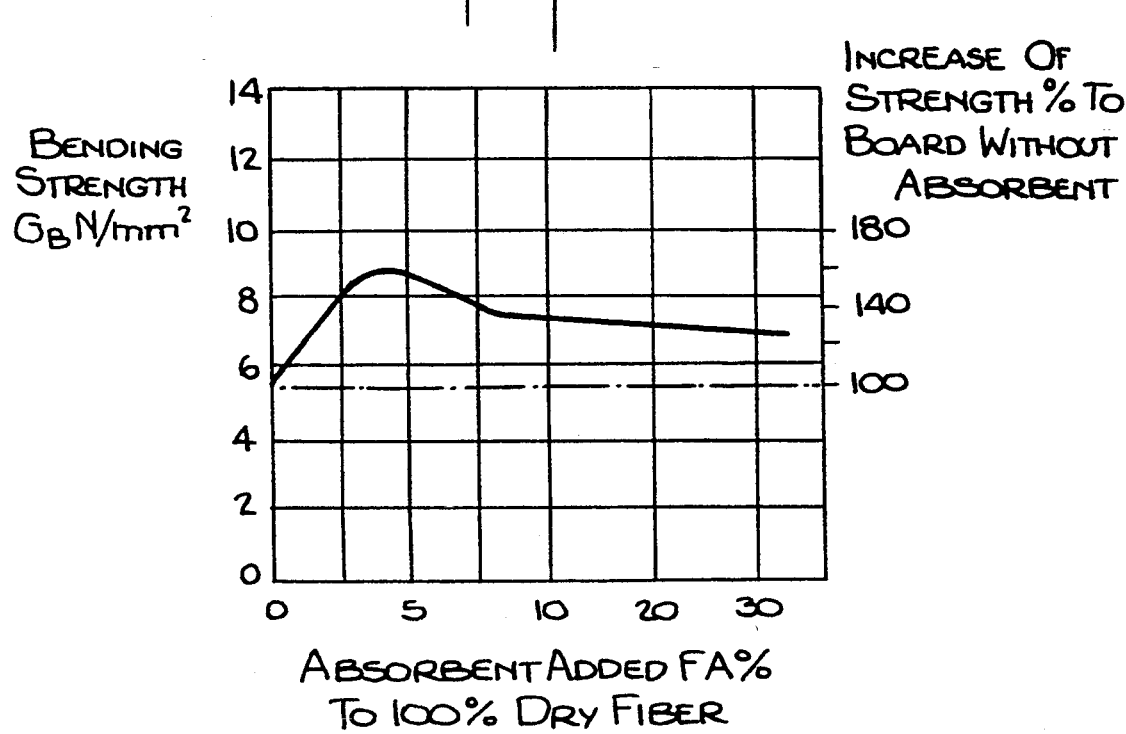
FIG. 1A is a plot of the bending strength of a board made according to an embodiment of the invention, versus amounts of an absorbent added to the board mixture.

The general aspects and principles of the invention will first be described, followed by a detailed description of the preferred embodiment of a production line to practice the methods of the present invention and manufacture fiber gypsum boards according to the present invention. When appropriate, reference will be made to the drawings wherein, wherever possible, like reference numbers refer to like parts.

The invention relates to a method and system for the manufacture of boards made of gypsum and fibers, particularly the partial or complete incorporation of the setting water of the dry calcined gypsum via fiber moistening. In the preferred embodiment, paper fibers are used as the water carrier, although the use of other fibers, such as wood fibers, falls within the scope of the invention. In a preferred three layer board low density porous particles are also used as the water carrier.

Fiber moistening according to a preferred embodiment of the invention is realized by adding absorbents to the fibers that prevent the fibers from balling at a high fiber moisture. The absorbents preferably also reduce the springback of the pressed, but not dry, preform by softening the fiber. The use of the absorbents also significantly increases the strength of the finished board.

In the preferred embodiment, the setting water is only partially incorporated via fiber moistening and a post moistening step is carried out after the final wetted fiber and dry calcined gypsum are mixed and just prior to the compression of the resultant preform.

The moist fibers preferably are mixed with the dry calcined gypsum at about the same time that the dry calcined gypsum and moist fibers are transferred onto the forming belt. Since the resultant mixture can be immediately pressed, this method permits the maximum acceleration of the dry calcined gypsum by adding accelerating agents to the dry calcined gypsum, the water, the fibers, and/or the absorbent. By adding an extremely fast reacting accelerator with the water for the post-moistening step, extremely fast setting can be accomplished. The setting of the dry calcined gypsum and most of the hydration are essentially carried out within a few minutes while the matt is compressed by a relatively short press in a continuous pressing operation. The resultant process thus reduces the springback of the board. It is thus possible to obtain boards having smooth surfaces, limited thickness tolerances without additional sanding and a high strength.

In the preferred embodiment, the fibers are formed and wetted in rotary mills. In one example, metered amounts of absorbents are added simultaneously with the metered feeding of the fiber mills with dry (ambient moisture up to 8%) disintegrated waste paper. The dry fibers are moistened in an air flow inside the mills during or shortly after the milling. This is achieved by spraying water into wing beater or turbo mills as they operate.

The present invention can make fiber gypsum boards from a variety of different fibers. For example, the process can use mechanically dewatered waste paper fibers prepared in a wet process, reject fibers from the paper pulp production, or thermomechanically refined wood fibers. Materials of this type require a dissolving of the fiber conglomerations and possibly further subsequent moistening and subsequent milling. This dissolving and moistening is done in special mills operating on a principle where disintegration (dissolving) is based on air turbulence. These mills are known as turbo mills, and their use will be described more fully below. The predetermined amount of fibers may fall, within the range of 12% to 35% by weight of the finished board. The predetermined amount of fibers may fall within the range of 20 to 30% by weight of the finished board.

In the preferred embodiment, depending upon the desired form of the board, metered amounts of moistened fibers and dry calcined gypsum are dispensed in layers on a preforming belt. These layers are then vertically mixed and at the same time transferred onto a forming belt on which a matt of mixed dry calcined gypsum and fibers are deposited. Moreover, dry additives can be added to the dry calcined gypsum or to the absorbent. Moist additives, soluble or liquid, can be added to the water or to the moistened fibers, or can be sprayed on the matt.

The resultant matt of wetted fibers and gypsum are formed on a conveyor belt and are subject to degassing and compression. The degassing is carried out after the matt is formed and is preferably achieved by opposed conveyor belts which preferably are air-permeable belts. As the matt is initially compressed between air-permeable belts which gradually incline toward each other, the gas is pressed out of the whole mixture.

The degassed matt is then compressed in a continuous press, entering the press prior to the initial setting. This press includes a compressing station (to provide the necessary compressive power) and a calibrating station (to compensate the springback pressure—elastic restoring force). In the compressing station, the preforms can be compressed beyond the desired thickness to reduce the springback to a minimum. If pressure sensitive additives are used, it is also possible to press by fixed stops only to the desired final thickness of the wet board leaving the press. The adjustment of the acceleration can be made so the setting for the most part can be completed inside the press. The matt as it leaves the compression station is then substantially set, so that only a minimum force is necessary to hold the matt to the desired thickness, in the calibration station.

The final setting, particularly the hydration, can subsequently be carried out on a conveyor belt or on the individual board segments in a stacking feeder 3180. The stacking feeders preferably go into the drier 3181. Since the process permits the maximum acceleration of the setting of the dry calcined gypsum, it is possible to minimize the machinery expenses for the presses, as well as the conveying devices to the drier. Moreover, it is possible to add the setting water in metered amounts at two or more separate steps, which allows working with the minimum of free water to dry out which reduces the energy consumption as well as the machinery expenditures.

The present invention solves the problem of fiber balling by adding absorbents to the fibers. It is the purpose of the absorbents to restrict the adhesion of the fibers to one another. Preferably the absorbents absorb the water, and prevent the fibers from adhering to one another. Fine ground materials, like raw gypsum (which at the same time serves to accelerate the setting of the gypsum), whitening, bentonite, magnesium oxide (MgO), cement and lime (CaO or $Ca(OH)_2$), are possible absorbents. The use of absorbents allows adding up to 250% moisture per 100% dry fibers. This strongly varies, however, with the kind of fiber and absorbent used. Solid powdered sodium silicate may be added to the absorbent.

In the preferred embodiment, paper fibers are used. Lime, particularly CaO, soft burned (having a very fast reaction time during the conversion into $Ca(OH)_2$) added during the milling of the dry paper showed the best results. One advantage of CaO is the splitting effect of the already fine particles into an even greater number of fine particles when coming in contact with the normal paper moisture. This results in an even better substantial enclosure of the fiber surface (also, the energy consumption of the mill is decreased by "drying out" caused by the absorption of water in the fibers by the CaO. CaO also is less expensive than $Ca(OH)_2$). The high alkalinity of the lime also causes the fibers to soften similar to the chemical (alkaline) refinement of wood during pulp manufacturing which, as an additional object of development, reduces the springback while pressing and the springback of the pressed but not yet dried board. By this and the softening the strength of the board increases up to 90% at the same density. The amounts of additives required to avoid fiber balling vary depending on the type of fiber and the degree of moisture. The absorbent preferably is lime and the fibers preferably are paper fibers and the amount of absorbent mixed with the fibers may be within the range of 2 to 10% by weight of the predetermined amount of fibers. For boards made of paper fiber, the amount of lime added to the fiber preferably falls within the range generally between 2 and 20%.

It is also possible to add a mixture of absorbents and chemicals or different absorbents, e.g., of 3% lime, 3% whitening and 3% raw gypsum powder. Instead of 3% raw gypsum powder 4% fine milled waste of the dry boards from the sawline can be used. By this combination a highly restricted balling effect and a high strength increasing effect can be achieved. It also compensates retarding effects of certain waste papers by adding a high amount of lime through the accelerating effect of the raw gypsum powder.

A plot of the bending strength of a paperfiber gypsum board versus the percentage of lime to dry paper fiber is shown in FIG. 1A. As shown in that figure, the initial addition of lime (up to approximately 4%) as an absorbent caused the rapid increase in the strength of the board. The board strength then gradually decreased to a fairly constant lower strength level at about 30% lime to fiber. From the testing and experimentation leading to the plot shown in FIG. 1A, it was concluded that the amount of lime added to paper fibers should be within the range of 2-10%, most preferably 2-6%. It is also apparent that the strength of the board can be varied as desired, by changing the lime fiber ratio.

Figure 1B:
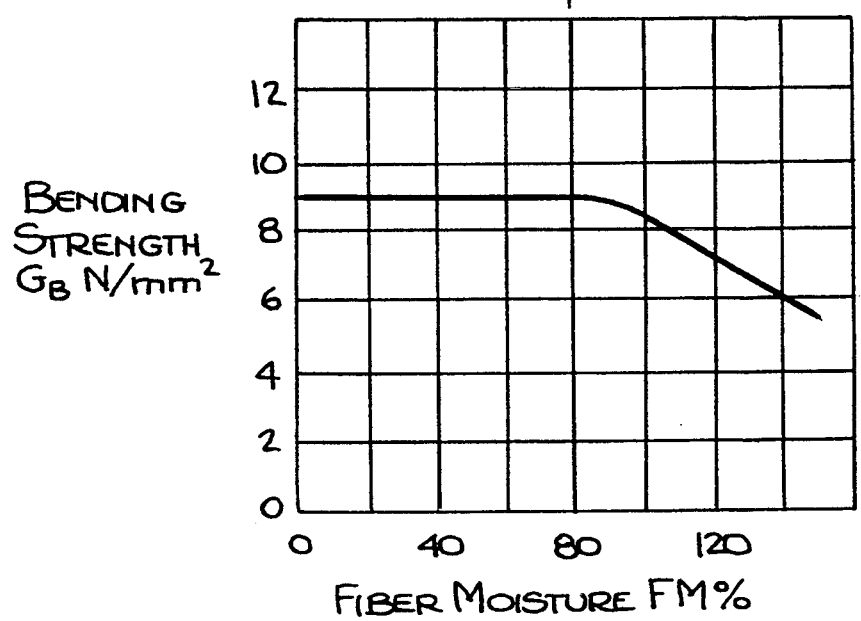
FIG. 1B is a plot of the bending strength of a board made according to an embodiment of the invention, versus the amount of water used to initially wet the fiber.

Through experimentation and testing, the inventors have found that the ratio of water added to the fiber during the preliminary wetting of the fibers has an effect upon the strength of the final fiber gypsum board. This relationship is shown in the plot included at FIG. 1B. As the plot shows, if the percentage of water added to fiber exceeds 80%, the strength of the board begins to decrease. At approximately 100%, the drop in strength becomes more sharp. Although these results specifically apply to boards made from dry milled paper fiber, it is believed that similar relationship will apply to boards made from different processed fibers. In view of these results, when the strongest board is desired, it is preferably to keep the water fiber percentage below 100%, and most preferably below 80%.

In order to obtain the strongest possible board for given types of gypsum fiber board (particularly those having a fiber content of 25% or lower), an additional wetting step is used in the preferred embodiment of the method. As explained more fully below, water is added, for example, sprayed into the falling material during the transfer onto the forming belt, onto the forming belt for the bottom surface and onto the fiber gypsum matt, or between individual layers, before degassing after the wetted fibers have been mixed, or sprayed onto the fiber gypsum matt, after the wetted fibers have been mixed and preferably after the formed matt of wetted fibers and dry calcined gypsum have been degassed. Because the mixture of wetted fibers and dry calcined gypsum are already wetted, the water added, for example, sprayed onto the board, is readily accepted by the board and migrates into the board. A sufficient amount of water is added onto the board to hydrate the board to optimum strength of the board and to ensure that the gypsum receives a sufficient amount of water to fully hydrate. If water is sprayed onto the board it is preferably sprayed onto both sides. Generally, the total amount of water available for setting of the dry calcined gypsum added in the fiber and to the fiber-gypsum matt is within 35%-50% by weight of the amount of calcined gypsum included in the board. The water ratio itself added to the fiber and to the fiber and the preform can be higher if, e.g., by very low pressure and low density boards the water is not fully available for the setting of the dry calcined gypsum.

The above disclosed supplemental watering step provides two related benefits that provide a stronger board. First, this second water step allows the user to keep the ratio of water to fiber in the fiber wetting step below 100%, most preferably below 80%. This results in the strongest board, from a water-fiber standpoint. The lower ratio of water to fiber also means that less absorbent, e.g. lime, is necessary to keep the fibers from balling. Therefore, it is possible to use lower percentages of lime and receive the benefit of stronger boards associated with this lower ratio. For fiber gypsum boards made from paper fiber, the inventors have found that through the two step process, the recipe for a board can include the most optimum ratios—namely 3-5% of lime to fiber and less than 80% water to fiber in the wetting step. It is expected that the preferred two-step water method of the present invention can be similarly applied to other fibers and associated absorbents.

Figure 1C:
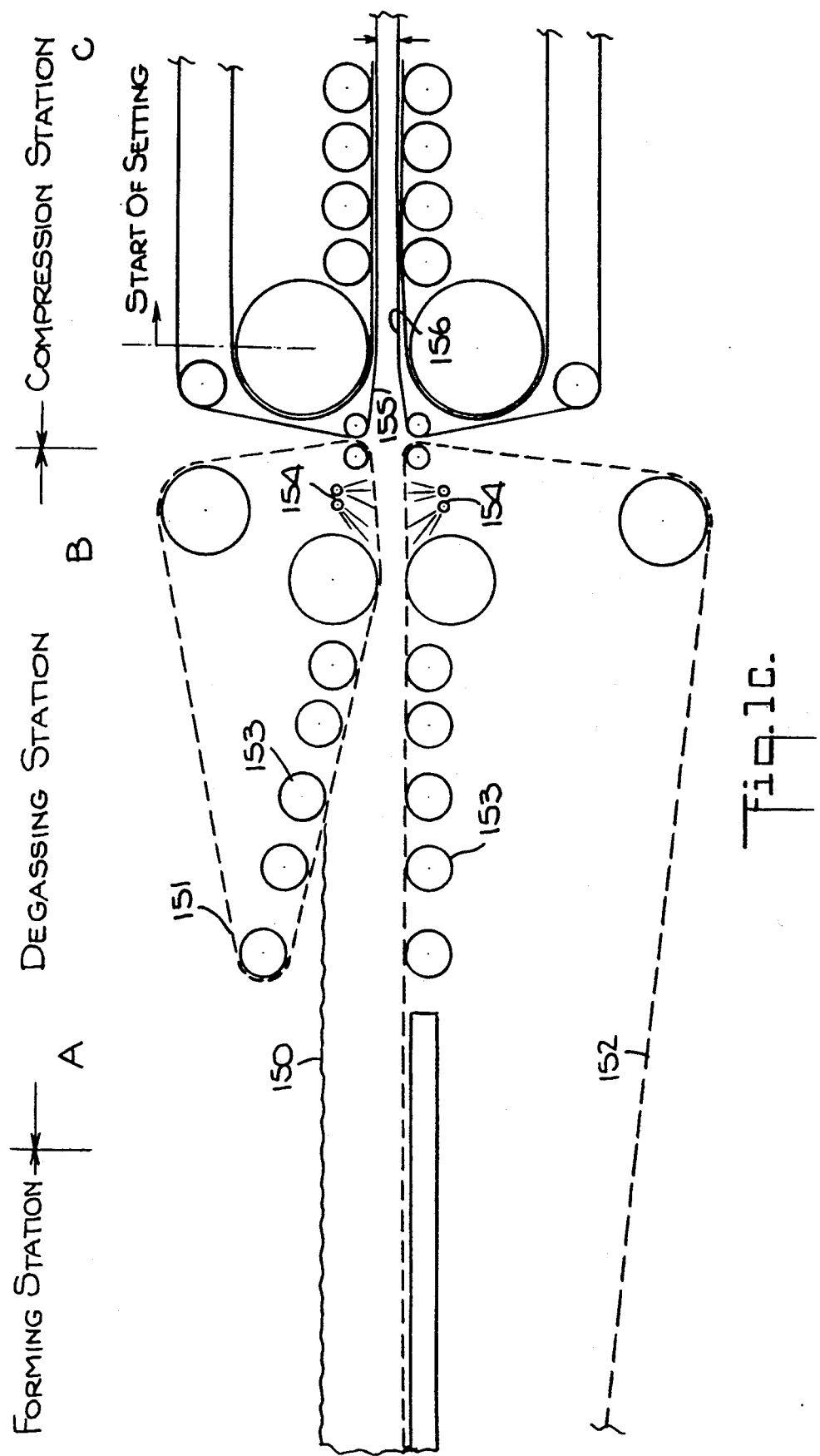
FIG. 1C is a schematic diagram illustrating certain steps of an embodiment of a method of the present invention.

A principal illustration of the preferred manner of effecting the second watering step is schematically shown in FIG. 1C. The formed fiber gypsum matt 150 first goes through degassing A station where the matt is compressed between rollers 153 and screen belts 151, 152 and gas escapes through the air permeable screen 151, 152 belts of the degassing station. The wetted mixture of fibers and dry calcined gypsum is then further compressed in the degassing B station. A preselected amount of water is then, for example, sprayed by sprayers 154 onto both sides of the compressed matt, preferably immediately as the matt exits the degassing station B. To the extent the matt attempts to spring back and suck in air, the suction effect will pull in the sprayed water, rather than air. Moreover, since the fiber gypsum matt is already moistened, it will readily accept the water and transfer it to the middle, as well as the exterior surfaces, of the board.

After the partially set matt or board receives the additional spray of water necessary to hydrate the calcined gypsum in the board to optimum strength, the board is then introduced into a compressing station C. In the compression station the matt is subjected to high pressure and is compressed to less than the desired thickness of the board and springs back to the desired thickness. The matt is compressed in the compression station C for approximately 1 to 3 seconds per foot, and during this step the compressed fibers release additional water to the dry calcined gypsum and the dry calcined gypsum begins to set. The board then goes into a calibration station which holds the board at a desired end thickness.

The further the water added to the fibers in the premixing step is reduced, the more the balling effect is reduced. Depending on the kind of fibers, it is possible to work without absorbent. However, because of the reduced water content, the water for optimum strength must be added in the post-moistening step.

If less or no absorbent is used and strength is gained, fine powdered or liquid chemicals with acidic or alkaline reaction can be added to the fibers by milling or with the water for moistening or additional moistening of the mixture, matt or preform by changing the pH-value and the softening and binding effect. For example $H_2SO_4$ can be added to the water, which also has an accelerating effect on the setting of the dry calcined gypsum.

Since the calcined gypsum is wetted by mixing with the moistened fibers only just before the degassing, compression, and calibration steps take place, strong accelerator additives can be introduced into the fiber gypsum mixture, resulting in extremely quick setting of the dry calcined gypsum. These accelerator additives can be added to the wetted fibers before they are mixed with the calcined gypsum, or can be added in dry form to the calcined gypsum before it is mixed with the fibers. Preferably, a sufficient amount of one or more accelerator additives are added to cause the wetted gypsum fiber mixture to set within the desired time period. By using post moistening it is possible to add an extremely fast accelerator with the water for the post moistening. Such an extremely fast reacting accelerator is waterglass. Waterglass was previously theoretically known to be an accelerator but was not practically usable because of its fast reacting time which starts the setting after a few seconds. The process in accordance with the present invention with post moistening makes usage of waterglass as an accelerator possible. This is because after adding it on the degassed preform, the matt or board gets compressed to its final thickness immediately or within a few seconds, preferably while the matt or board is moving at a speed of 1 to 3 seconds per foot.

Waterglass can be added to the spraying water in FIG. 1C and also improves the properties of the board, for example, strength and moisture resistance. The availability of this quick setting in the present invention permits the creation of a production line in which the matt is substantially set as it exits the calibration station. As a result, the length of the compression station can be reduced, and considerably less compression is needed in the calibration station. Accordingly, the costs of the equipment needed to compress and calibrate the matt while the dry calcined gypsum is setting is substantially reduced.

In summary, in the preferred embodiment of the present invention, the ratio of fibers to gypsum can vary over a wide range, specifically including the lower percentage required by some fire regulations. The balling of the fibers, when wetted, is prevented by adding a sufficient amount of an absorbent that is capable of restricting the adhesion of the fibers to one another. The ratio of water added to wet the fibers and the ratio of the absorbent are preferably kept within ranges that provide the strongest end product. The amount of water wetted to the fiber in the preliminary wetting step is at least sufficient to enable the resultant matt of wetted fibers and gypsum to readily accept additional water that is added in a subsequent spraying step.

The matt leaving the degassing station is substantially formed so that the matt has sufficient strength for a free release from the matt-forming belts 151, 152 onto the press-forming belts 155, 156 so that water can also be sprayed on both sides of the matt, without the need of carrier belts between the degassing and the compression stations.

Now that the general principles of the present invention have been described, specific aspects of the methods, their proposed application in a production line, and boards made according to the invention will now be described.

The fiber can be milled or dissolved and/or wetted by different machines. For dry waste paper, wing beater mills can be used, provided that an additional system is added for spraying in the setting waters in the dry flow of fibers. Solutions with accelerators, binding agents (for example, starch), diluted acids, and other additives can be added to the fibers along with the water.

For wet-processed waste paper fibers (e.g. from collected household waste paper), reject fibers of pulp production, or thermomechanically refined wood fibers, turbo mills can be used. Turbo mills operate without screens on the backup principle or the turbulence principle in which two-thirds of the disintegration is achieved by the turbulent interaction of the fibers against each other. At the same time, for dry paper or for additional moistening, water is sprayed into the turbo mill.

The wetted fibers are preferably layered onto a conveyor belt, and the gypsum is then layered onto the wetted fiber. The thorough mixing of the wetted fibers and gypsum is preferably then carried out in vertical pinwheels. The vertical mixing, however, is best achieved with a particular device which accounts for the difficult characteristics of the moist fibers. This was accomplished by (horizontally) offset spiked disk rollers which permit a uniform mixing of the moist fibers without the formation of balls. So-called turbulence disks which engage the spiked disk rollers keep the latter clean.

The preferred degassing station has at least one porous belt (and preferably two) installed downstream of, and directly following the last vertical mixers. The formed matt is compressed to nearly desired thickness. To the extent that a springback does occur, the air absorbed thereby can be pressed out again without the formation of bubbles/separations when entering the main rollers of the compression station. The principle applied is the one of a rolling press which is significantly less expensive than, for example, continuous, area-specific presses (individual rollers or rods of very thin diameters and support surfaces, in all cases covered with steel bands for these pressure requirements).

The inexpensive nature of the roller presses allows the increase of the pressing times to 2-3 min and allows the plaster to reach 80-90% of the wet strength through a maximum acceleration of the setting process inside the press. This maximum acceleration also significantly reduces springback and minimizes the amount of compression needed in the calibration step. This facilitates the operation in the calibration station and allows the creation of boards having a higher strength and smoother surfaces, as well as boards with small thickness tolerances which do not require subsequent sanding of the dry boards.

The present invention preferably uses at least two separate watering steps. For example, when dry waste paper is used, it can be moistened up to 150% of water without balling. However, to preserve strength, the fibers preferably are only moistened to 80-100% and exposed to subsequent moistening which depends on the fiber contents of the preform. The reduced moisture content of the fibers creates less contamination of the apparatus in contact with the final mixture, especially the mixing heads. For a board having a fiber content of 16%, this corresponds to a water-calcined gypsum ratio of 18–22%, hence only slightly above the stoichiometric amount of water required. It has been found that approximately 45% of water to the dry calcined gypsum should be added, to ensure the optimum of strength. Therefore, about the same amount of water added to the fibers must be incorporated in a second step.

The preferred solution is the subsequent moistening of the degassed preform. The premoistening and precompressed preform accepts water absorption at a substantially higher degree than a still completely dry material. Moreover, the matt exiting the degassing station has sufficient strength for a free release onto a parted forming belt in order to allow both the top and bottom surfaces to be further moistened. Instead of air, the material absorbs water by suction during springback. The water supplied onto the board may contain strongly effective accelerating agents or other additives increasing the speed of setting, since the final compression is carried out immediately afterwards.

The adding of water onto the top and bottom of the matt allows the still very moist surfaces to peel off of the upper and lower forming belt more smoothly after the application of the water. In addition, pulverous plaster (or other materials) can be dispensed onto the matt through powder nozzles. Such plaster adheres well and improves the surface of the board with respect to appearance, availability and surface treatment, as well as fire resistance. As another example, viscous fillers can be sprayed or applied by rollers on both sides of the preform between the gap of the forming belts.

Figure 1D:
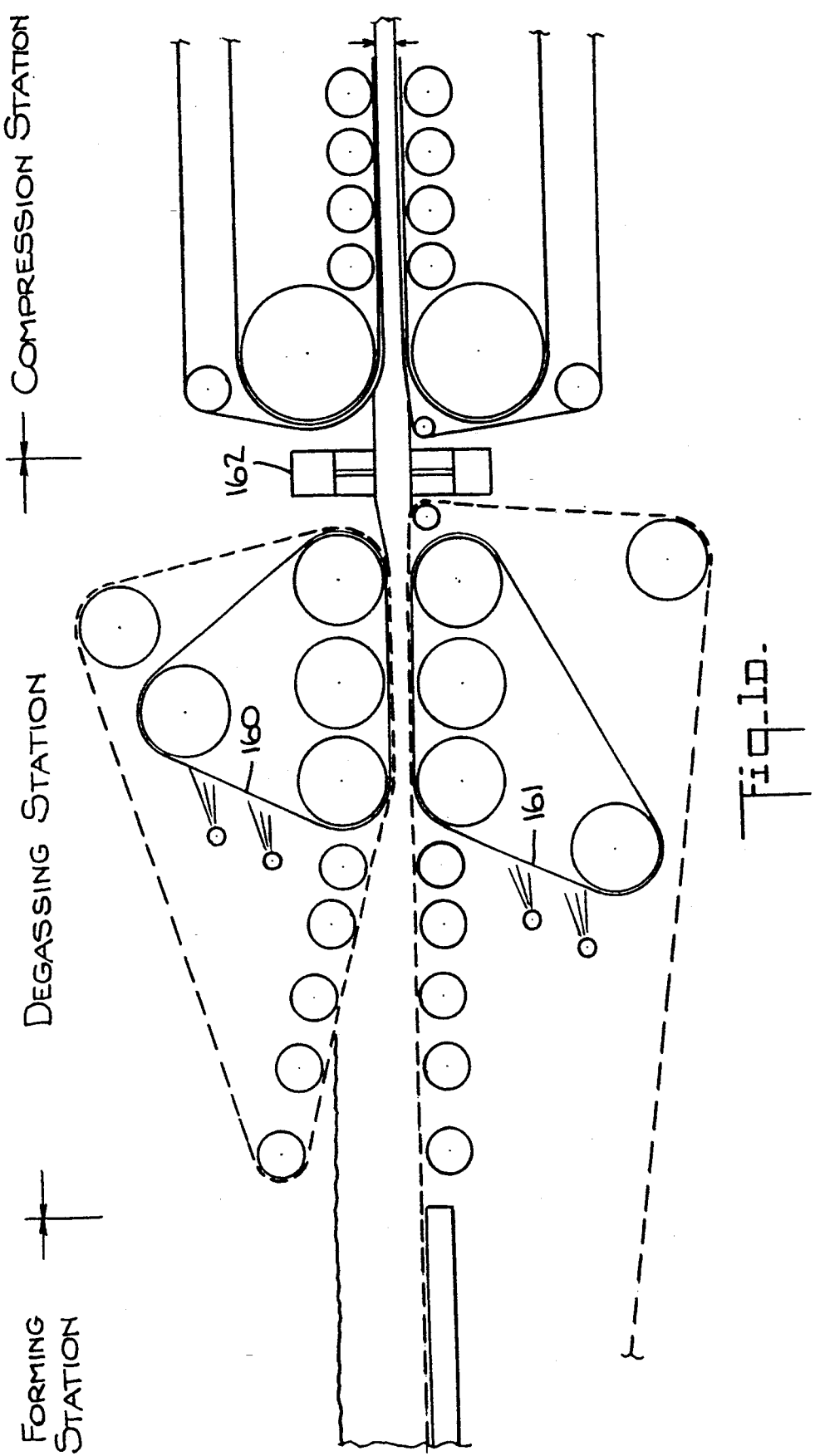
FIG. 1D is a schematic diagram illustrating steps of another embodiment of a method of the present invention.

The incorporation of the water is made possible by absorption. The water preferably is added in the gap which forms between the degassing roller casing and preform and/or sprayed onto the matt during and/or after degassing, but, as represented in FIG. 1D, it is also possible to release water through water-carrying belts 160, 161, e.g. felt belts with further simultaneous degassing via pairs of rollers disposed downstream inside the degassing-screen fabric belt. The amount of moisture added depends on the water necessary for the hydration of the dry calcined gypsum to an optimum of strength, the absorption capacity of the respective preform, and the composition of the initial material. A dry calcined gypsum powder coating dispenser 162 may be utilized as represented in FIG. 1D.

While the second watering step may not achieve absolute uniform moistening for thick one-layer boards, this is not a significant disadvantage since a sufficient amount of water for the stoichiometric setting of the plaster (and some surplus water) often is already incorporated through the wetted fibers and since any strength reduction is in the middle or neutral zone where strength is less essential. Moreover, this potential lack of uniform moistening can be overcome in the manufacture of 3-layer boards which can have a high wetted low density porous particle, e.g., perlite, vermiculite, foamed glass or pumice content in the center layer. By moistening the perlite, it is possible to incorporate enough water for the plaster setting in the center layer so that only the covering layers need to be provided with additional water.

FIGS. 1 through 10 illustrate a production line for making fiber gypsum board and composites of the present invention, according to the methods of the present invention. As will be explained in more detail below, the end product can be a homogenous board (illustrated in FIG. 11) or a multilayered composite product (illustrated in FIG. 12). The homogeneous board is preferably a gypsum board reinforced by fiber, such as paper fiber. The multilayered board can take many forms. In the preferred embodiment, the multilayered board has a core layer including lightweight materials, such as expanded perlite, and bottom and top surface layers of fiber gypsum.

The homogeneous board and the multilayered board of the present invention can be made according to the same basic process and with a similar, if not identical, production line. In the preferred embodiment of the process, several layers of board forming materials are placed on each other before the board is fully formed, pressed, and dried. To make a homogeneous board, each of the layers is identical in composition. To make a multilayered board, two or more different layers are used.

With reference to the Figures, the production line includes several general areas. First, the various materials used to form the board are prepared or held in preparation areas. Such preparation areas are shown in FIGS. 1–5 which will be described in more detail below. The materials are combined and placed into layers on a moving conveyor, in a forming area, illustrated in FIG. 6. The formed matt is then degassed, compressed and calibrated in a pressing area illustrated in FIG. 7. The formed endless boards are then cut into individual boards in a cutting and conveying area (illustrated in FIG. 8) and then completely dried to a finished product in a dryer area (illustrated in FIG. 9). The dry boards are then cut and stacked in a finishing line (illustrated in FIG. 10).

The production line for making a multilayered board, having perlite and fiber and gypsum for the middle core, will first be described. The use of the methods and equipment to produce different boards according to the present invention will then be described.

The formation of the board can be described with reference to FIG. 6 which shows three forming lines. Each forming line has three preforming belts 3126, 3166 and 3146 on which the wetted fibers and dry calcined gypsum with additives for the surface layers and wetted perlite fibers and dry calcined gypsum for the core layer are formed. With reference to the top and bottom surface layers, wet fiber from the mills 2311, 2212 (shown in FIG. 5) is carried by a closed loop pneumatic conveyor 2511, 2512 to the forming station where the fibers are separated from the air by a cyclone. The separated fibers are deposited into shuttle conveyors on the top of fiber formers 3114, 3134. The fiber formers spread via spreader heads 3115, 3135 a preselected amount of fiber, according to the weight ratio of a preferred recipe, onto the preforming belts 3126, 3136, forming a matt. The spreader heads preferably include a plurality of rollers which cause a uniform layer of fibers to be placed onto the preforming belts.

Immediately downstream of the spreader heads 3115 and 3135 are scalper rolls 3117 and 3137, respectively, which scrape off excess fiber and thereby equalize the thickness of the matt. The scalper rolls can be adjusted in height to ensure that the deposited matt of fibers has a uniform weight, and a vacuum is applied at the rollers to pneumatically draw off excess fibers. Fibers scraped off by the scalper rolls are recycled pneumatically by pneumatic conveyors 2513 and 2507 into the same shuttle conveyors on the top of fiber formers 3114 and 3134. The preforming belts operate at a constant speed.

Figure 6:
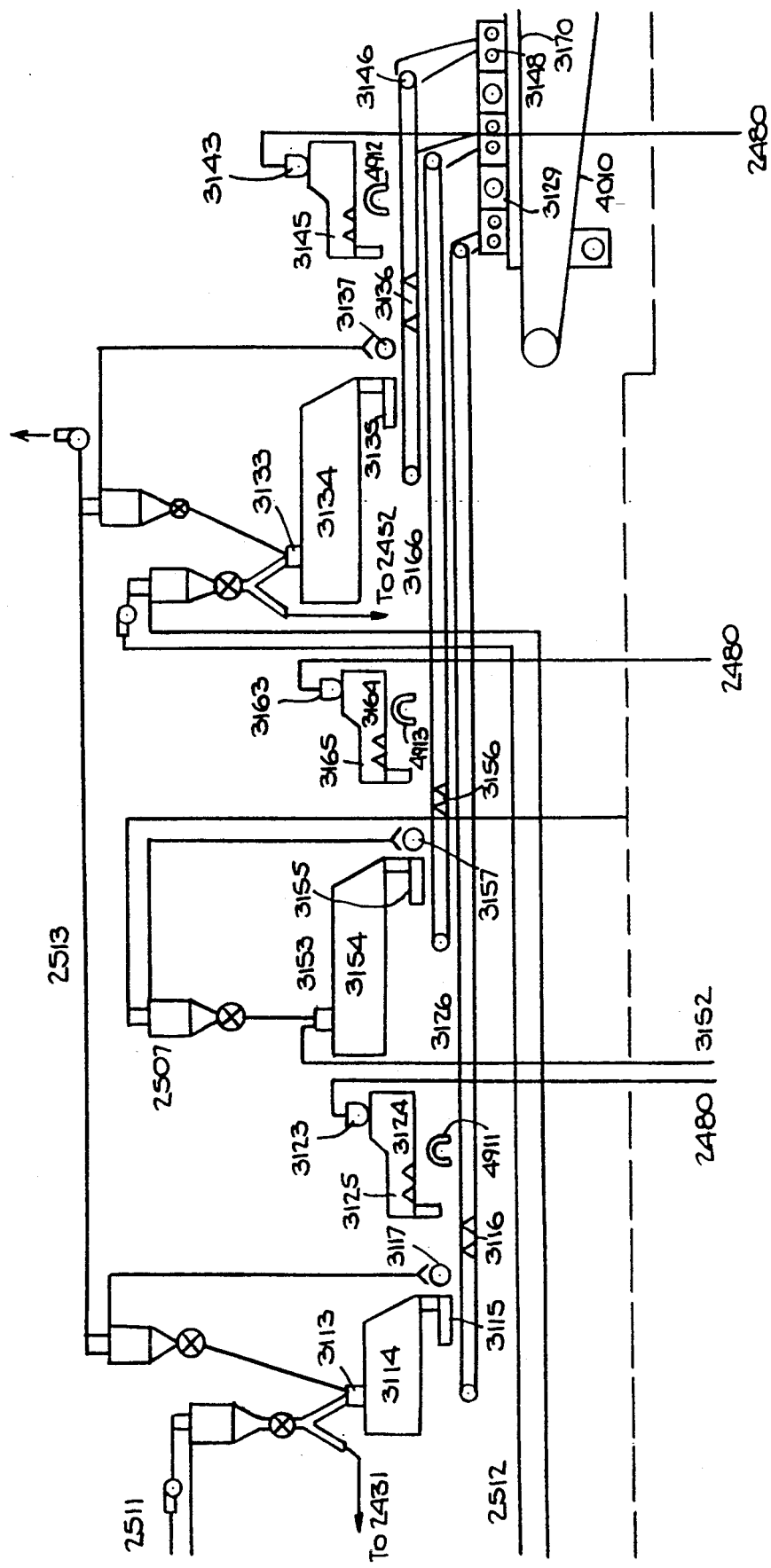
FIG. 6 is an illustration of a forming station of a production line made according to the present invention.
Figure 7:
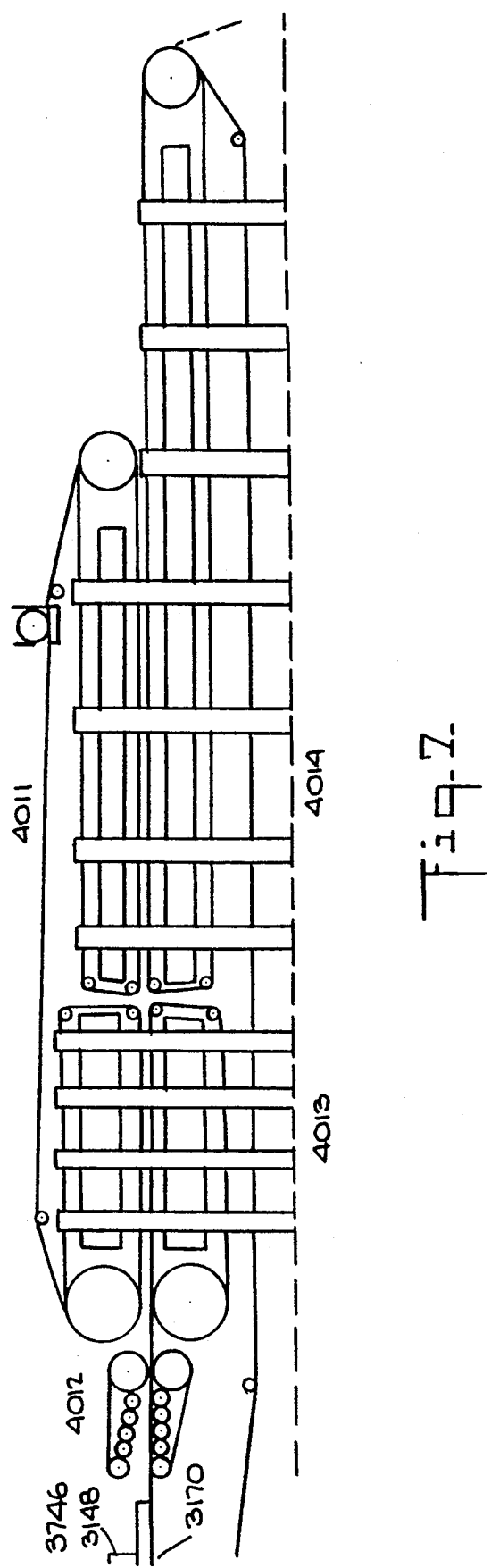
FIG. 7 is an illustration of a pressing area of a production line made according to the present invention.
Figure 10:
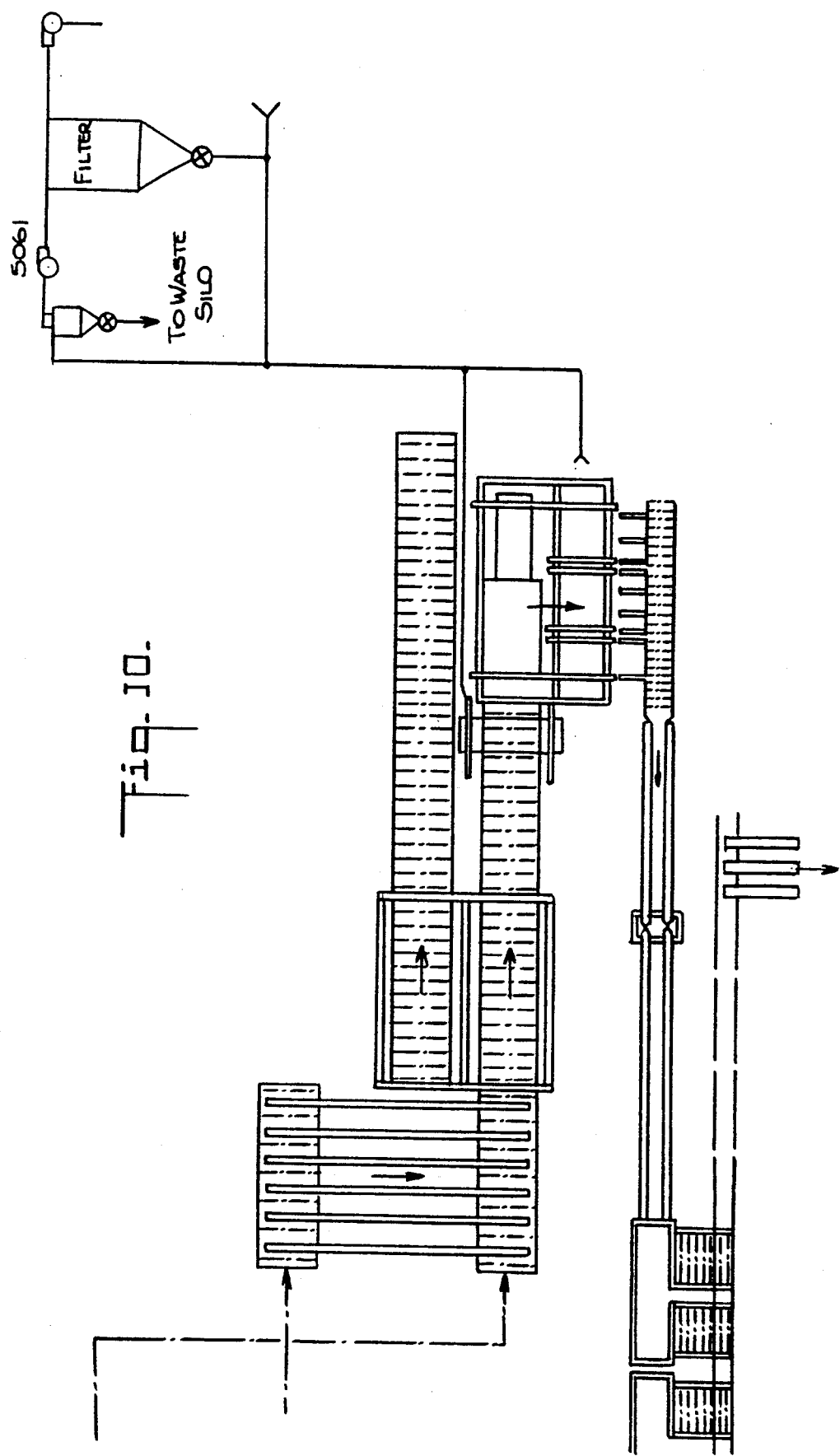
FIG. 10 is an illustration of a final production area of a production line made according to the present invention.

The dry calcined gypsum additive mixture from distribution bin 2480 (shown in FIG. 4A) is fed to plaster forming bins 3124, 3144 (shown in FIG. 6). The plaster, as explained below, is predominately calcined gypsum, although the plaster may include other additives (shown in FIG. 2) to control the chemical process. The gypsum is metered from the forming bins by conventional means, such as conveyors, chutes, or rollers. The bins have a variable speed bottom belt conveyor with an integrated matt scale 3125, 3145 to control the amount of plaster deposited on the preforming belt depending on the recipe. The correct amount of plaster is added as a top layer onto the fiber matt.

Figure 16A:
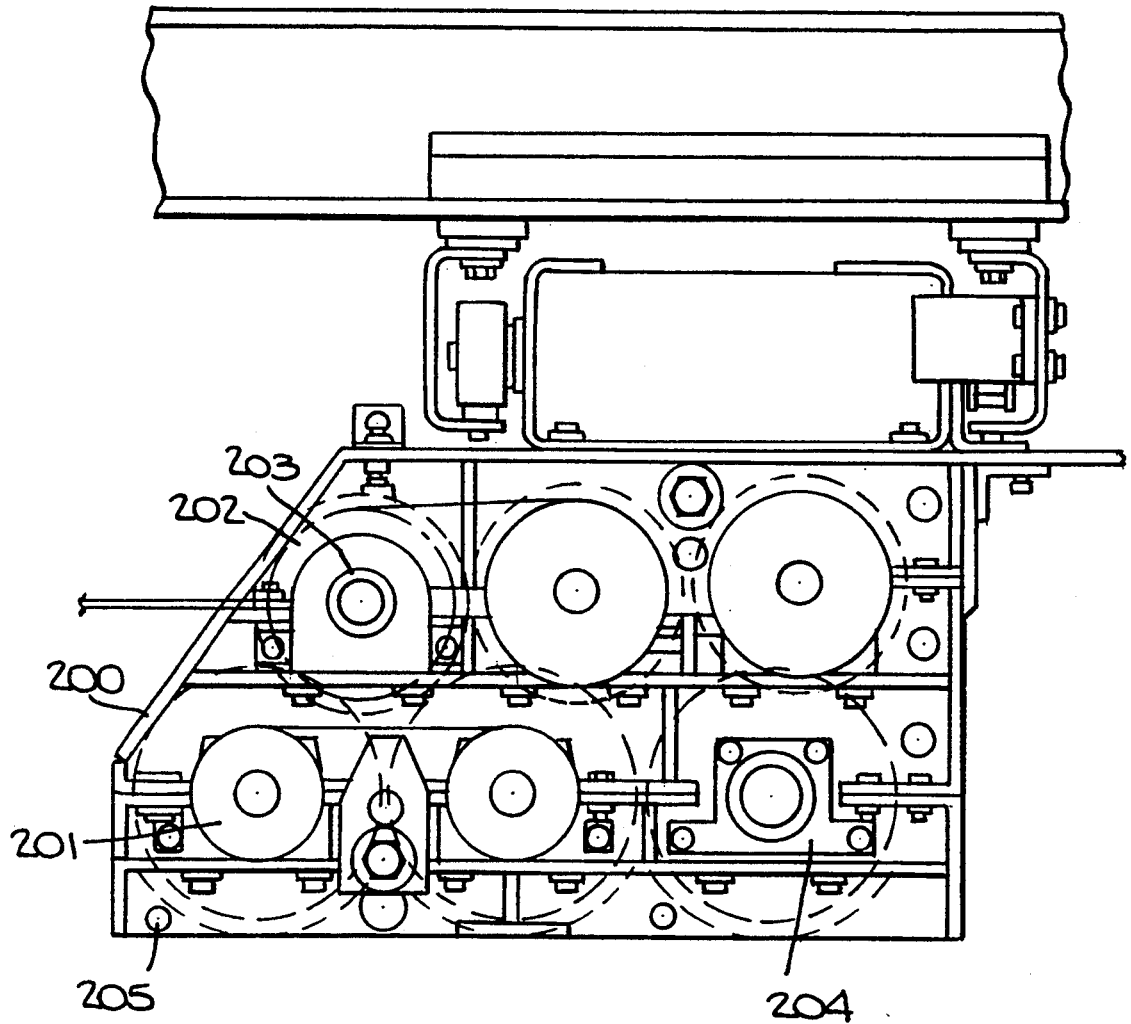

At the head section of the preforming belts, the fiber-plaster layer is guided downward onto mixing heads 3128 and 3148. The mixing heads comprise sets of spike rollers (shown in FIGS. 16A and 16B) which thoroughly mix the fiber and plaster into a homogeneous composition and carry the mixture from the head of the preforming belt (infeed) to the outfeed of the mixing head onto the forming belt 4010. Depending upon the distance from the preforming belt head to the mixing head, a series of spike rolls controls the downward motion of the material. Additional sets of turbulent rollers, as shown in FIG. 16A, automatically clean the mixing rollers.

For a multilayered board, the core layer is formed in a similar manner to that of the surface layer. In the example being described, less fiber is included in the core layer because a volume of expanded perlite is used in the core layer. Expanded perlite is included in the core layer to reduce the overall specific weight of the board. Expanded perlite also will carry more setting water for the plaster. Preferably, the mixture of wetted paper fibers and perlite particles are moisturized so that they will carry all of the water necessary to hydrate the plaster to optimum strength added to form the core layer. As explained below, in the preferred embodiment an adhesive, preferably liquid starch, is first mixed with the water for moistening the perlite, and the fibers are separately mixed with water. The wetted fibers and wetted perlite are then mixed together to form a uniform mixture.

Referring again to FIG. 6, a wetted perlite, starch and fiber mixture (from conveyor 3152, shown in FIG. 4) is deposited in fiber former 3154, which is identical in structure and operation to formers 3114, 3134. The perlite, starch and fiber mixture is deposited onto preforming belt 3166 through spreader head 3155, in the same manner as the board surface layers. Preforming belt 3166 layers the perlite, starch and fiber mixture from fiber former bin 3154 with the plaster from forming bin 3164 and delivers the components to a mixing head 3168. Forming bin 3164 includes an integrated matt scale 3165. The core layer forming line includes a scalper roller 3157, matt scales 3156, and a mixing head 3168 which operated in the same manner as the elements in the surface forming line.

Behind the mixing heads 3128 and 3168 are precompressor rollers 3129 and 3169 which remove as much air as possible from the formed matt. Following the formation of the matt on the forming belt 4010, the three layered matt is pressed by a press line, shown in FIG. 7. In one embodiment, the forming belt 4010 is also part of the press line and extends through the press and calibrating sections. In another embodiment (not shown in FIG. 7 but shown schematically in FIG. 1C), the forming belt ends at the degassing station 4012 of the press line, so that there is an open gap between the degassing station and the compression station. Behind the last compressing roller of the degassing station, spraying nozzles are installed for adding additional water for moistening the surface layers of the matt from both sides.

The press line includes three main sections, the degassing station 4012, the compression station 4013, and the calibration station 4014. These stations can be adjusted to vary the spacing between the conveyor belts as well as the pressure being applied to the matt of gypsum, fibers, additives, and other materials. The adjustment of the station, therefore, allows the user to vary the thickness of the board.

Initially, the matt is precompressed by the degassing station 4012 to remove air from the matt. For a standard board, this station reduces the matt from a thickness of several inches close to the final thickness which can vary, e g. from ⅜ to ¾ inch. Next, the degassed matt is pressed in compression station 4013 where the matt is subject to a high load and pressed to the final board thickness. The matt then goes through calibration station section 4014 which holds the thickness of the board to allow the setting process to continue.

After pressing and prior to drying, the boards are cut and prepared to enter the dryers. Referring to FIG. 8, the boards, which are formed and pressed endlessly, are pre-trimmed and cut into e.g. 24 foot long pieces. Two stationary and one traversing high pressure water jets 3171, 3172, 3173 cut and trim the board. Water jet 3171 and 3172 trims the length, while water jet 3173 cross cuts the board. While in the cutting area and immediately prior to, the board is supported by an air cushion which lifts the board but does not provide forward motion. This air cushion is provided by air jets or similar means (not shown) which are well known in the art. Belt conveyors 3176, 3177 accelerate the board to a high conveying speed.

The dryer area 4210, shown in FIG. 9, is equipped with three setting zones before the first drying zone. The drying section of the production line is well known in the art and therefore will not be discussed in any detail.

The boards leaving the dryer area, from the point of view of thickness and board properties, are ready to be shipped. Outfeed cages 3182 and the lifting station 3183 take the boards from the dryer and transfer them, at high-speed, to a finishing line area depicted by FIG. 10 where the boards are then trimmed and cut into panels. After grading and packaging, the board stacks are ready for shipment.

As can be seen from the above disclosure, the present invention provides a method for producing gypsum boards and composite boards having a variety of preselected characteristics. Generally, only a sufficient amount of water is included with the wetted fiber to properly hydrate the gypsum to optimum strength.

In the preferred embodiment, three separate mixing lines are utilized, thereby providing three layers of the board. If each of the layers is made from the same materials, a homogeneous board is provided. On the other hand, as shown in the described example, the layers can be of different materials. For example, a board can have the same outer layers and a lighter, inner layer according to the above description. A board with three different layers also can be created. For example, a board could have an outer layer made of fiberglass, fibers and gypsum to provide increased strength and fire resistant, an intermediate layer of perlite, fiber and gypsum, and an outer decorative layer of textured fiber and gypsum. The textured layer would be achieved by including a texturized belt on one side of the compression and calibration station.

If a single layer board of uniform consistency is desired, then a single mixing line can be utilized to form a uniform matt of selected materials. By means of example, the single matt could be a matt of fiber and gypsum; fiber, gypsum and starch; or paper fiber, fiberglass, and starch. It will be also obvious to a person of ordinary skill in the art that more than three lines can be utilized, thereby providing more than three layers. For example, if it is desired to have a board with five separate layers, five separate lines of conveyor belts, pinwheels, and mixers could be utilized. Regardless of whether a homogeneous or composite board is desired, the forming, cutting and drying steps would be substantially the same, differing only to best accommodate the characteristics of the chosen layers.

Figures 1, 16A:
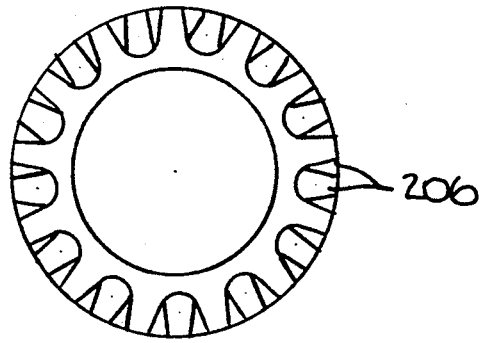
Figures 2, 16A:
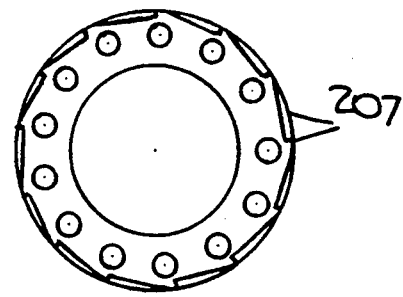

The preferred equipment used to prepare wetted paper fibers is depicted in FIG. 1. The paper, initially in bales, is fed into shredder 2001. The paper used in this process preferably consists of discarded newspaper. Number 6 newsprint has been found to be an excellent fiber for this process. This paper consists of baled newsprint containing less than 5% of other papers. Each shredder has a hydraulic cylinder which pushes the bale against a rotating cylinder equipped with teeth. The cylinder mills the bale into paper pieces, approximately 8×8 inches and several pages thick.

Belt conveyor 2401 are equipped with a permanent magnet and metal search coil. Any tramp metal which is large enough to be dangerous causes the belts to stop and the metal is removed manually. Hammer mills 2101 reduce the paper pieces to about the size of a stamp. The clippings are then conveyed pneumatically from the hammer mills via distribution conveyors 2403, 2404 to clipping bins. The clipped paper is distributed to clipping bin 3100 (FIG. 5), to supply the surface layers of the board and to clipping bin 3050 (FIG. 4) for the core layer.

Figure 3:
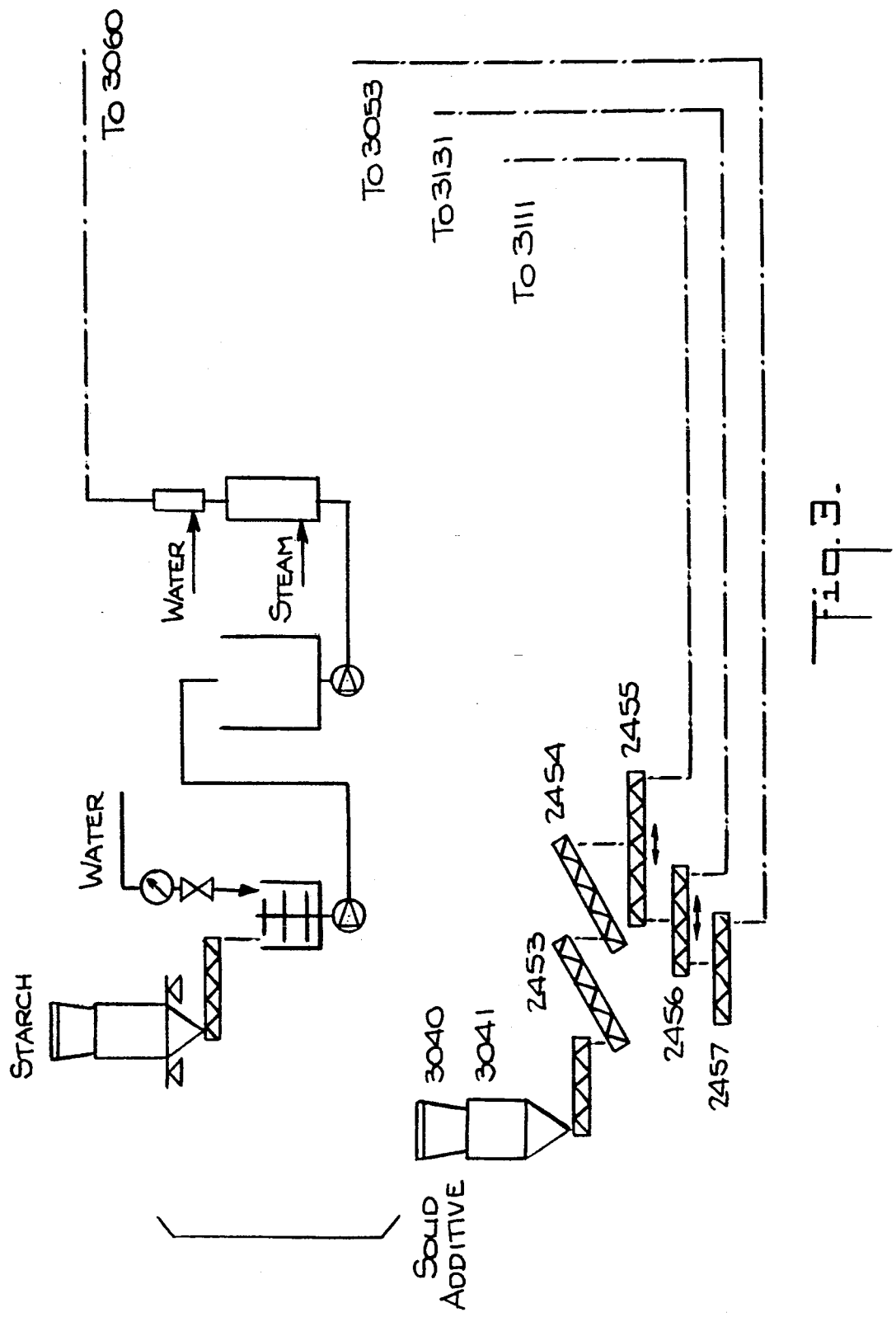
FIG. 3 is an illustration of a solid additive and starch distribution areas of a production line made according to the present invention.

The mills 2301, 2311, 2212 produce the paper fibers with the necessary fineness and mix water with the fibers prior to mixture of the wetted fibers with the plaster. As shown in FIG. 3, the absorbent lime is delivered to a dosing system 3053, 3111 and 3131 via distribution screw conveyors 2453, 2454, 2455, 2456, 2457 and fed into the mill with the paper clippings. The paper clippings are dosed by weight belts 3051, 3110 and 3130. As previously explained, the mills can be wing beater mills or turbo mills, depending upon the type of fibers used.

FIG. 14 is a side view and FIGS. 14A and 14B are schematic partial cutaways of a turbo mill for dissolving and wetting fibers according to the present invention. In FIG. 14 there is represented an absorbent intake pipe 170, a paper clippings intake pipe 171, water nozzles 173, and wetted fibers output pipe 172.

In FIG. 14A, which is a sectional view taken along line 14A—14A of FIG. 14, there are represented a housing 174, stator plates 175, turbo plates 176 and turbulence chambers 177. In FIG. 14B, which is a sectional view taken along line 14B—14B of FIG. 14A, there are represented the housing 174, stator plates 175, disks 178, milling/turbo plates 176, turbulence chambers 177, rotor 179, drive 180, and shaft 181 and bearing 182.

In a turbo mill, the wastepaper is fed into the bottom of the mill. The mill has a coarse rotating wheel at the bottom and finer wheels toward the top. A coarse rotating wheel first interacts with the paper and places it into a rotary motion. The paper begins to fractionate by interaction with the wheel and with itself and progresses upward toward a smaller rotating wheel which interacts with the paper and passes it on to another rotating wheel. The principle of milling in the turbo rotor is based on a high air throughput. The airstream in the milling zone becomes extremely turbulent in between the rotating and fixed parts of the mill. The particles of paper in the mill are constantly changing speed and direction of travel very rapidly due to the air turbulence. The impact of the paper particles among each other causes the paper particles to fractionate and creates most of the milling action. As the particles flow through the machine and are broken into fibers, water is introduced as a fine spray into the milling chambers. The water is preferably added to the fiber in the upper regions of the turbo mill. The air turbulence and rotary motion of the fibers provides a very fine blending of the paper fibers and water, without any adverse balling of the fibers and water.

If wing beater mills are used, the water is added as a spray at the exit of the mill. Dry fibers are moved through a screen in which the fibers fraction to decreasing size. The use of wing beater mills to create fibers is well known in the industry. However, the inventors have modified the mills and their use by adding spray nozzles at the chamber of the wing beater mill where the fibers come out of the screen of the mill to wet the exiting fibers.

The wetted fibers are loose, not balled and have a fluffy consistency. The wetted fiber from mills 2311, 2212 is pneumatically conveyed to the fiber formers of the forming station of FIG. 6. The sizes of the fibers preferably range from minute particles to elongated fibers up to 2000 microns by screen test. The fibers may be waste paper fibers and preferably substantially all of the waste paper fibers are sized by screen less than 2000 microns and the absorbent may be CaO having at least 50% of the particles being less than 32 microns and with less than 4% of the particles being larger than 100 microns.

Figure 2:
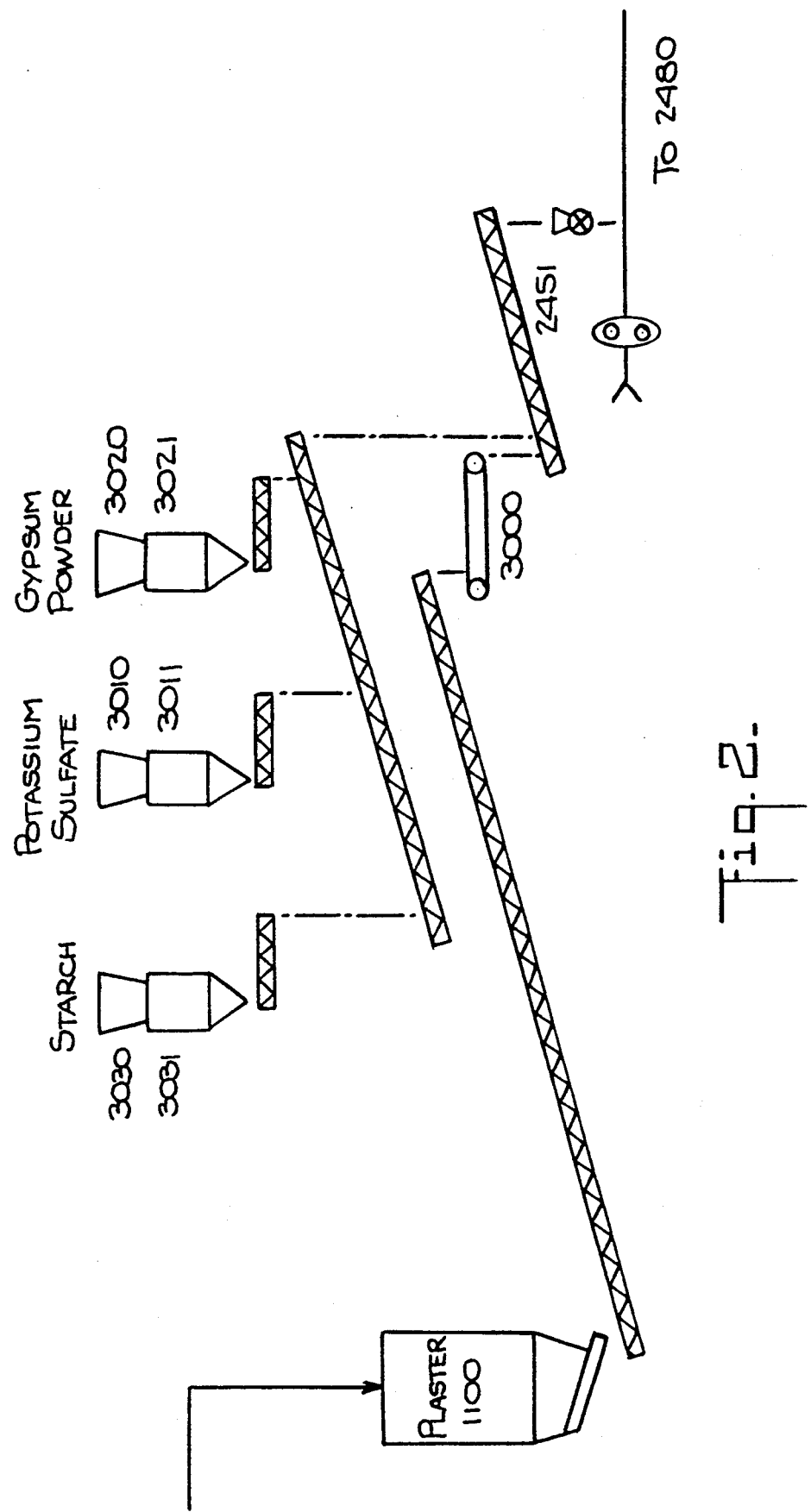
FIG. 2 is an illustration of a plaster preparation area of a production line made according to the present invention.

The plaster component of the board is prepared as shown in FIG. 2. If the natural raw gypsum is used in the process, it is first calcined via any conventional method before it is used in the process. In the process, the particles of gypsum are dehydrated from two molecules of water to one-half a molecule of water. Such a calcining process and the equipment for preparing the plaster are conventional in the art.

The calcined gypsum is stored in a day bin and from there metered into the production line. In order to accurately meter the additives which will be described, the plaster passes a weightbelt 3000. The signal from the weightbelt 3000 is used to control the flow of additives in a mixing screw 2451.

Additives from hopper 3011 and hopper 3021 can be added to the plaster to accelerate the setting and hydration. For example, potassium sulfate and ground gypsum can be added to the plaster to accelerate the setting and hydration. The raw gypsum powder may be less than 3% by weight of the dry calcined gypsum and the potassium sulfate powder may be less than 1% by weight of the dry calcined gypsum. As shown in the Figures, a mixing screw 2451 is used to mix the plaster and additives into a homogeneous mixture having the proper amount of additives to the plaster, depending upon the recipe. Referring to FIG. 3, hopper 3041 is represented in FIG. 3 for solid additive.

Figure 4:
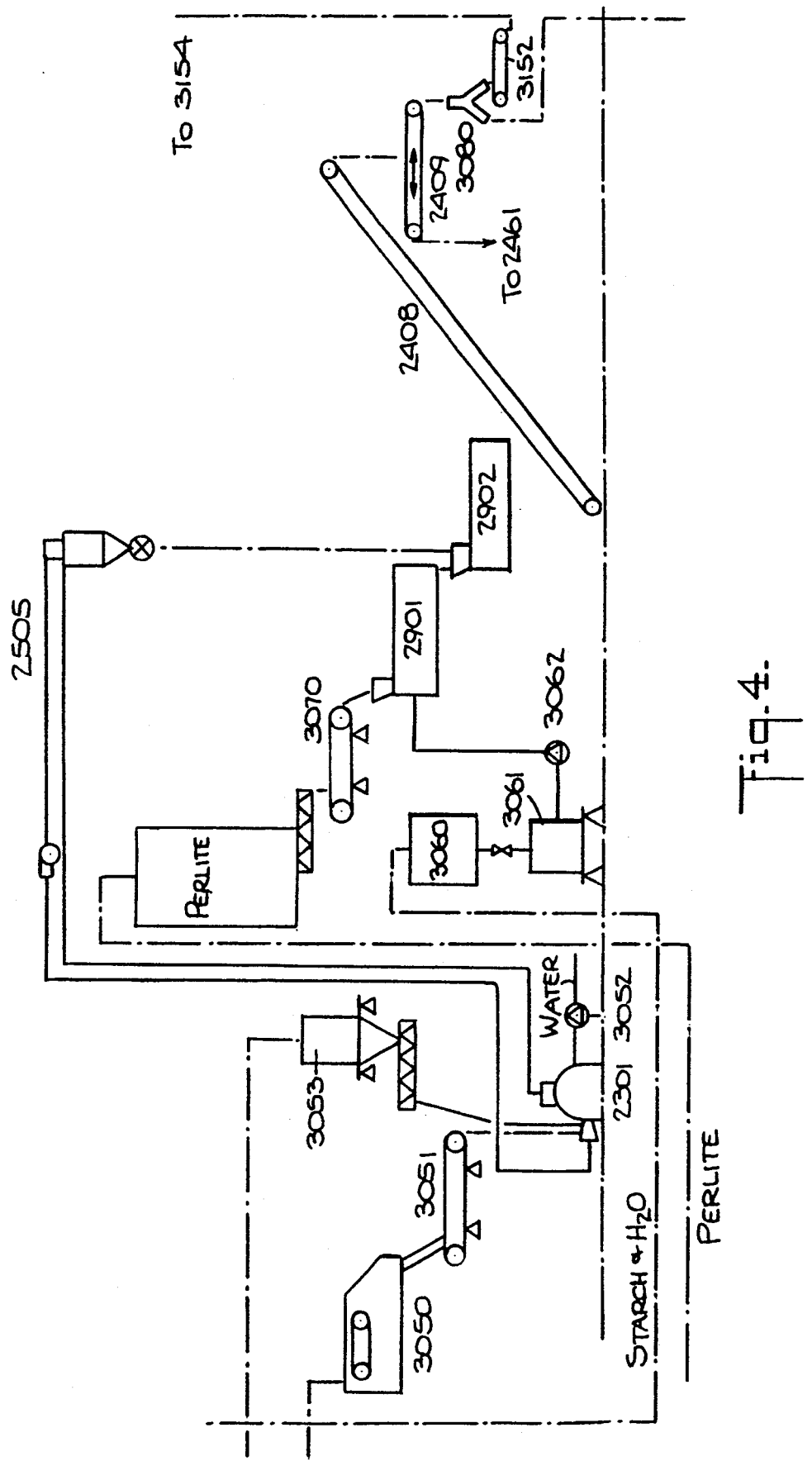
FIG. 4 is an illustration of a core layer material preparation area of a production line made according to the present invention.

The perlite for the core layer of a composite board is prepared as shown in FIGS. 3 and 4. Expanded perlite is stored in a bin with a controlled outfeed. The actual weight of the perlite is measured by a weightbelt 3070 (FIG. 4) which provides a signal used to add a liquid starch solution (from 3061) to a primary blender 2901. The liquid starch solution is made from water and starch and is prepared at site as shown in FIG. 3. The starch solution is metered gravimetrically via starch storage vessel 3060 into starch weighing vessel 3061 and then is sprayed by pump 3062 into blender 2901. In the blender 2901 the perlite and liquid starch are thoroughly mixed.

In the secondary blender 2902, the wetted perlite leaving the blender 2901 is mixed with prewetted paper fiber. The prewetted fiber is conveyed from a mill by a pneumatic conveyor 2505. In the mill 2301, paper fibers and water are mixed together in the same manner as previously described with reference to mills 2311 and 2212. Since the mixed core layer includes expanded perlite and paper fibers, the amount of fiber used is less than that of the surface layers.

A conveyor 2409 (FIG. 4) runs the mixed material, via a distribution gate 3080 to the core layer fiber/perlite former 3154 in the forming station shown in FIG. 6. As previously described, this wetted perlite, fiber, starch and additive mixture is then mixed with dry gypsum to form the middle layer of the composite board.

Figure 11:
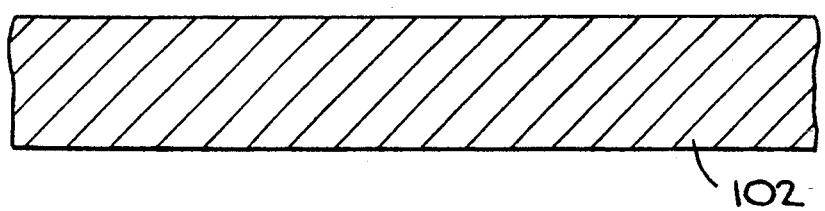
FIG. 11 is a cross section of a fiber gypsum board made according to the present invention.
Figure 13:
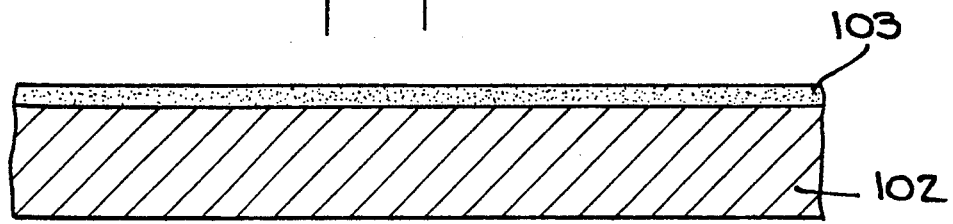
FIG. 13 is a cross section of a fiber gypsum board with a decorative texture imprint made according to the present invention.

If all three layers are made of a fiber gypsum material, then a uniform, homogeneous board 102 such as shown in FIG. 11 is achieved. This homogeneous board is made of a mixture of lignocellulose fibers, gypsum and additives, as previously explained. As shown in FIG. 13 the uniform, homogeneous board 102 can be provided with a variety of decorative surfaces 103.

If a smooth surface is desired, smooth belts are used in the calibration station. On the other hand, textured belts can be used in the compression and calibration stations, thereby providing textured designs on one or both surfaces of the gypsum board.

Figure 12:
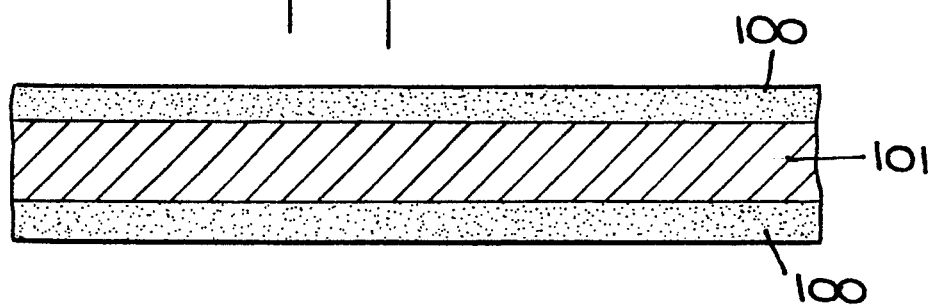
FIG. 12 is a cross section of a composite board made according to the present invention.

The fiber and perlite composite board made according to the above method is illustrated in FIG. 12. The top layer 100 and the bottom layer 100 are fiber gypsum layers, while the middle layer 101 is a perlite, fiber and gypsum layer. Because perlite is included in the middle layer, the composite board is lighter in weight without significantly sacrificing any strength.

The following is an example of a recipe for such a board.

The surface layers have a waste paper fiber content of 30% of the surface layer of the finished board. By milling, 10% CaO was added to the dry paper and 120% water was added to the fibers. Natural gypsum fine milled and calcined to semihydrate was mixed with fine milled powders of 2% gypsum dehydrate, 1% potassium sulfate and 4% starch.

The core layers have a fiber content of 8% milled with 2% CaO and wetted with 60% water. 30% dry, expanded perlite (size: 90% of the material between 30 and 1000 mg by screen test) was mixed with the same amount of a 5% starch-water dispersion. The same gypsum-semihydrate-mixture was used. The material ratio of the surface to core is 1:1.

A board made according to the above recipe meets the initially stated quality requirements regarding weight and strength. At 930 kg/m$^3$ density, the strength amounted to 8–12 N/mm$_2$. The covering layer can have a fiber contents of up to 30% and still meets, as a fire "shield" the ratings of the US "fire rating" requirements according to ASTM C 16 because of the effect of the center layer which has the high perlite and gypsum content.

By using the method of post-moistening, it is also possible to significantly reduce the fiber content without a major strength reduction since the covering layer can then be compressed at a higher density while maintaining the same total density. Boards e.g. were thus manufactured having a total fiber content of only 12% for strength of 9 N/mm$^2$ at a density of 930 kg/m$^3$.

The latter strength values refer to natural gypsum, the results can be improved using FGD-gypsum. Dry and semi-dry processes are particularly suitable for the processing of this kind of gypsum and chemical gypsum.

Boards according to the present invention can be made of practically any size, and the boards can be formed or subsequently machined to have a variety of shapes. By means of example only, the edges of the boards can be shaped as tongue and groove joints or the exterior of the boards can include decorative textures. Boards made according to the present invention have excellent nail and screw holding properties, and the face of the wall board is already plaster. The board therefore can readily accept any conventional finishing materials, including wall paper.

The present invention also allows the production of gypsum board having strength and/or density not previously possible. Since the wetted fibers and plaster mix form a uniform mixture which is substantially dry, the mixture can be compressed as desired in the press shown in FIG. 7. The density and thickness of the resultant board therefore can be controlled within a considerable range. By means of example only, the present invention can produce a board having densities within the range of 25 lbs per cubic foot (pcf) (400 kg/m$^3$) to 75 pcf (1200 kg/m$^3$), or higher. The type and size of fibers and the other materials included in the board can also be varied as desired. As a result, the gypsum board can be a truly engineered product tailored to meet particular end use requirements.

Figure 15:
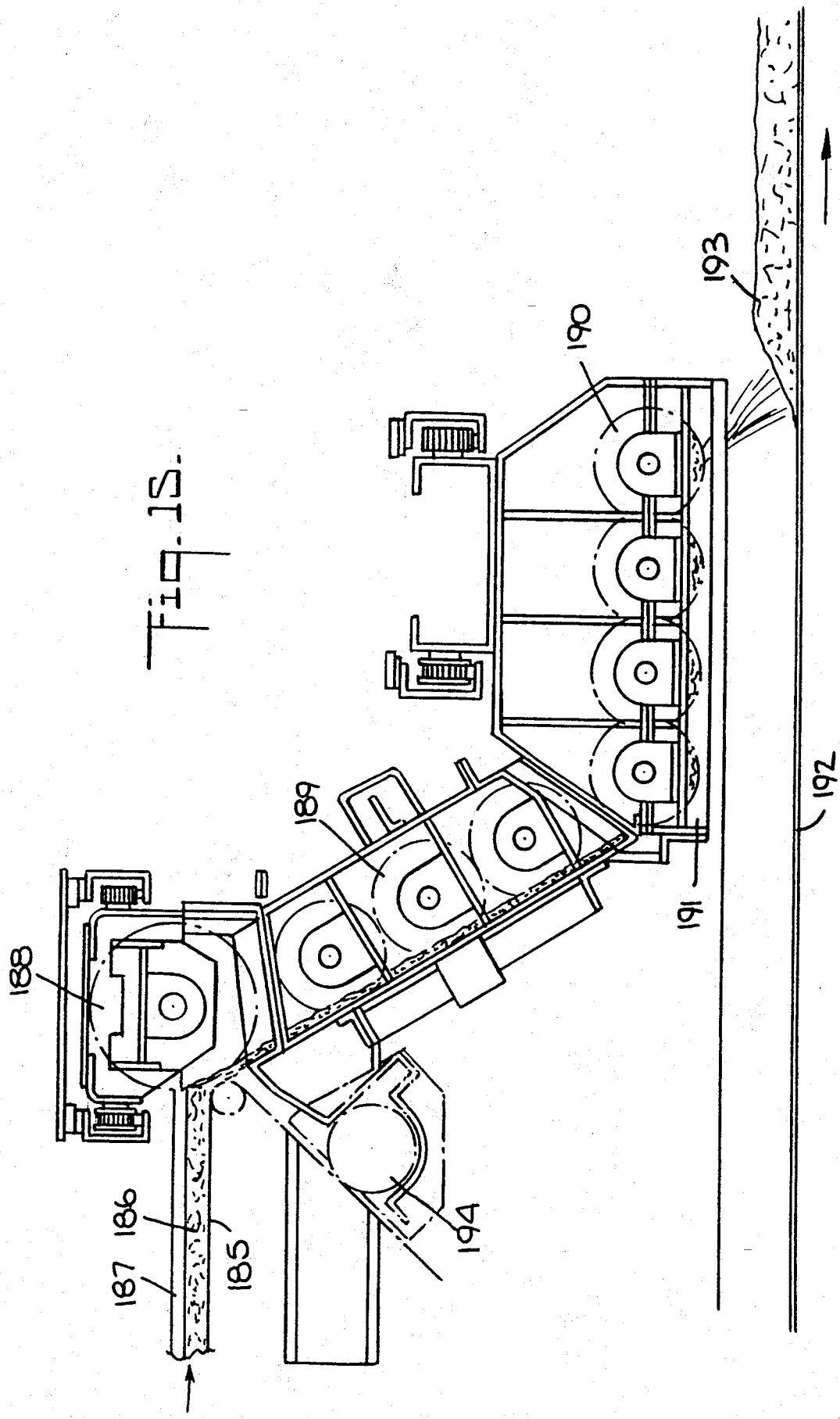
FIG. 15 is a schematic side view of a mixing station of the present invention.

FIG. 15 is a schematic side view of a mixing station of the present invention. There are represented a preforming belt 185, a fiber matt 186, a plaster layer 187, a distributing spike roller 188, transfer spike rollers 189, mixing spike rollers 190, guiding plates 191, forming belt 192, mixture 193 and cleaning brush 194.

FIGS. 16A, 16A-1, and 16A-2 are side views of a vertical mixture and mixing and cleaning disks, respectively. There are represented a housing 200, a drive 201, cleaning turbulence rollers 202, bearing 203, mixing spike rollers 204, guiding plate 205, mixing spike disks 206 and cleaning turbulence disks 207.

Figure 16C:
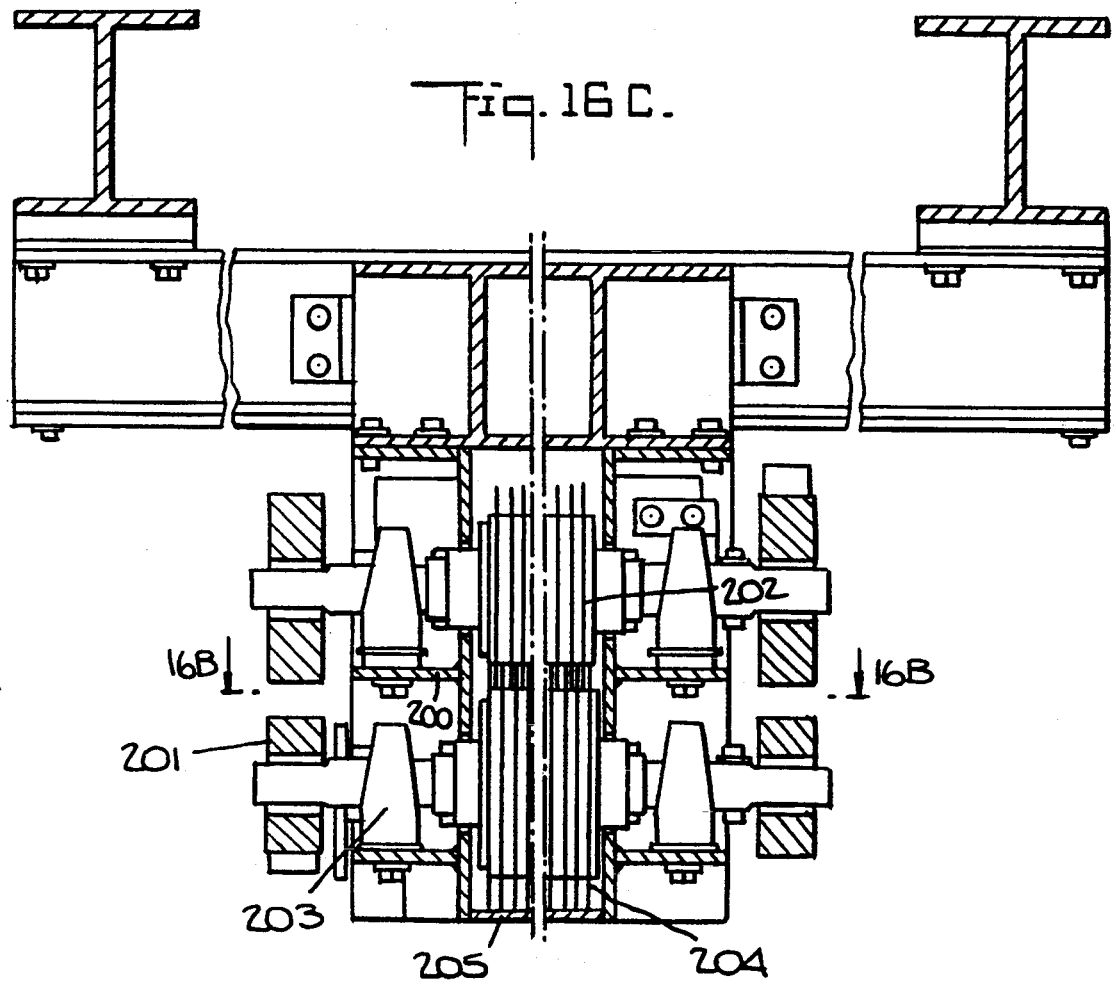
FIGS. 16B and 16C are partial cutaways of top and a front view of the vertical mixer of FIG. 16A.
Figure 16B:
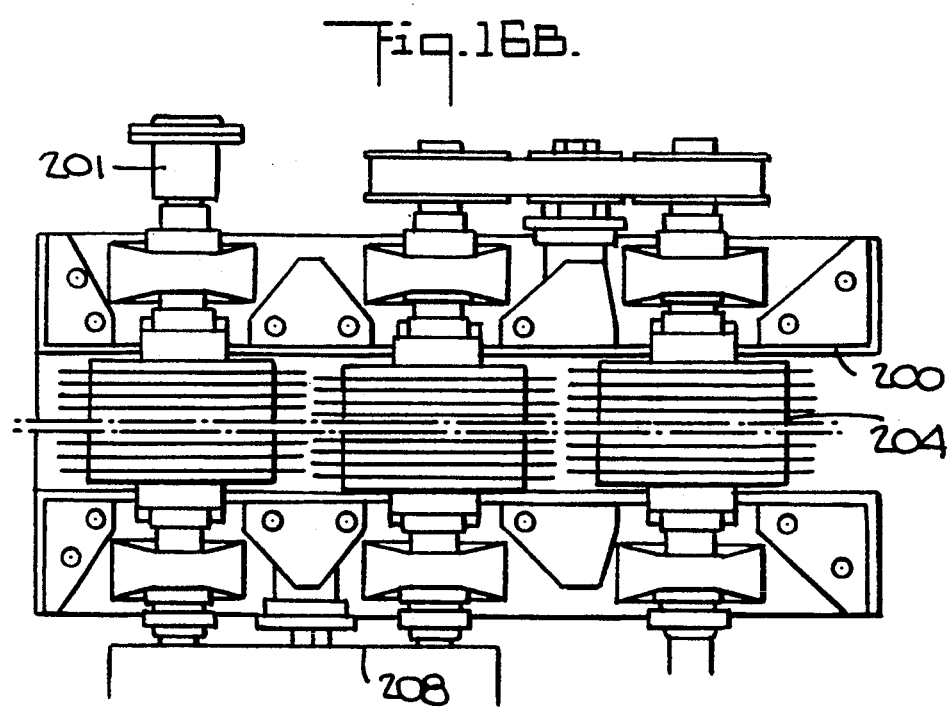

FIGS. 16B and 16C are top and front views of the vertical mixer of FIG. 16A, also showing drive 208.

Figure 17:
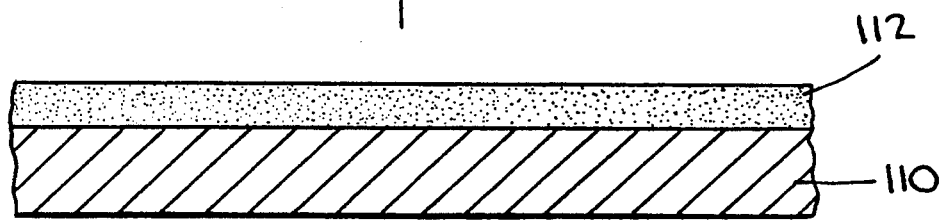
FIG. 17 is a cross section of a fiber gypsum and wood composite board made according to the present invention.
Figure 18:
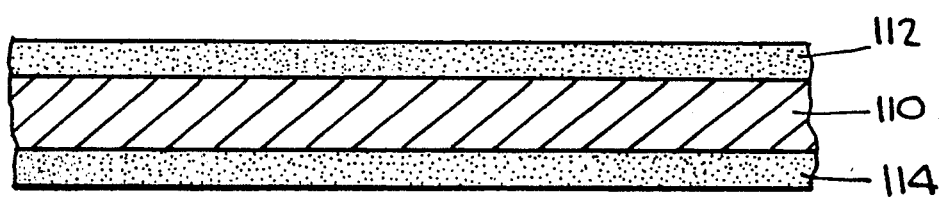
FIG. 18 is a cross section of a second embodiment of a gypsum and wood substrate board made according to the present invention.
Figure 19:
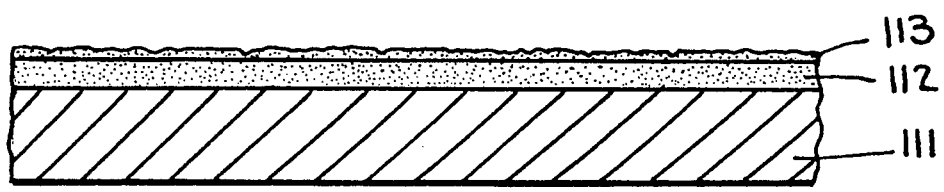
FIG. 19 is a cross section of a third embodiment of a fiber gypsum and wood substrate board of the present invention, the board including a decorative coating made according to the present invention.

FIGS. 17 through 19 illustrate three embodiments of a gypsum and wood substrate board made according to the present invention. As will be explained in more detail below, the end product can be a board having a gypsum layer on one side (illustrated in FIG. 17) or a board having a gypsum layer on both sides (illustrated in FIG. 18). The layer of gypsum on the board is preferably a homogeneous gypsum layer reinforced by fiber, such as paper fiber or fiberglass fibers. The layer or layers of gypsum can take many forms. In the preferred embodiment, the board has a wood substrate for its core and includes one or more layers of homogeneous fiber gypsum. A resin is used to bond the gypsum to the wood substrate.

Several embodiments of a composite wood substrate and gypsum board are illustrated in FIGS. 17 through 20. In the embodiment shown in FIG. 17, the composite board includes a wood substrate 110 and a fiber gypsum overlay 112 which is bonded to the wood substrate 110. The wood substrate 110 can take a variety of forms, including plywood, particle board, waferboard, wood laminants, and similar conventional wood or wood-like building products. The fiber gypsum overlay 112 is securely bonded mechanically or adhesively using epoxy cement, for example, to the wood substrate 110 and is preferably a homogeneous layer of gypsum and fiber. The gypsum fiber overlay is fire-resistant and smoke resistant and adds to the overall strength of the resultant composite board.

The composite board illustrated in FIG. 18 is similar to the embodiment shown in FIG. 17, except that both a top surface fiber gypsum overlay 112 and a bottom surface fiber gypsum overlay 114 are formed on the wood substrate 110. The resultant board has fiber gypsum surfaces on both of its sides, thereby providing increased fire resistance. In addition, such a board can provide a finished exterior surface, along with the increased strength provided by the wood substrate.

In the embodiment shown in FIG. 19, the exterior surface 113 of the fiber gypsum overlay 112 is embossed with a decorative surface. Through a pressing process, a variety of decorative surfaces can be rolled or pressed into the fiber gypsum overlay while the overlay is being finished.

Figure 20:
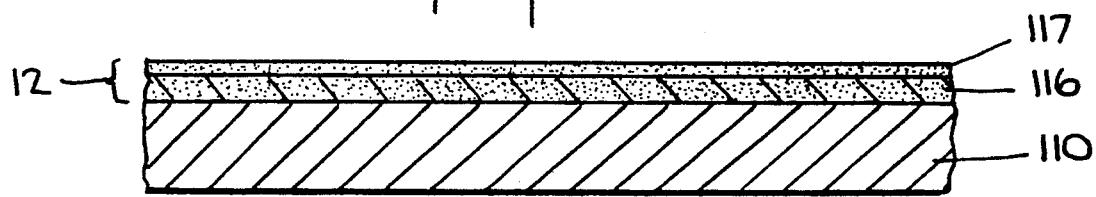
FIG. 20 is a cross section of a fourth embodiment of the present invention, that embodiment including an intermediate fiber gypsum layer bonded to the substrate and a second fiber gypsum layer on the exterior surface.

In the embodiment shown in FIG. 20, the fiber gypsum overlay 112 is composed of two separate layers of gypsum material. The first layer 116 is a fiber, perlite and gypsum layer which provides a light weight core layer bonded to wood substrate 110. The second layer 117 is a fiber gypsum layer which provides a smooth exterior surface to the panel and which binds to the light weight core layer.

The various embodiments of the composite board of the present invention can be made according to the same basic process and with a similar, if not identical, production line to that previously disclosed. In the process, a coating of a bonding agent such as resin is applied to the wood substrate. Next, one or more layers of fiber gypsum comprising the wetted fibers, absorbent, gypsum and accelerator additive are deposited over the resin-coated substrate. The resultant fiber gypsum layer and wood substrate are then pressed and dried, preferably in a continuous process.

Before the layer of gypsum material is deposited onto the wood substrate, the surface of the wood panel is preferably roughened by a surface cutter which will surface cut the side or sides of the panel to which the gypsum will be applied. The cutting or roughing up of the surface of the wood substrate provides for better bonding of the gypsum overlay to the panel. A special mineralic-fire resistant glue is then sprayed on the roughened surface. One such glue is waterglass (sodium silicate) which is available from Philadelphia Quartz.

Acceptable adhesives and resins include urea and phenol formaldehyde, urethane, and recorcinal type resins.

As should be apparent to those skilled in the art, the method of the present invention can be used to produce fiber gypsum boards and composition boards that are made from various materials and additives.

Other embodiments of the invention will be apparent to those skilled in the art from consideration of the specification and practice of the invention disclosed herein. It is intended that the specification and examples be exemplary only, and with a true scope and spirit of the invention being indicated by the following claims.

What is claimed is:

1. A method of producing gypsum fiber board comprising the steps of:
    mixing in preliminary mixing step a predetermined amount of fibers, an absorbent for restricting the adhesion of the fibers to one another to inhibit balling of the fibers, and water to form a mixture of wetted, loose fibers and absorbent;
    mixing in a final mixing step the wetted fibers and absorbent with a predetermined amount of dry calcined gypsum to form a mixed composition;
    wherein an accelerator additive is added to one of the fibers, absorbent, water and gypsum to speed the setting of the gypsum of the mixed composition;
    laying the mixed composition into a matt having a substantially uniform consistency;
    compressing the matt to form a board composed of bonded fibers and gypsum; and
    drying the board to provide a finished board.

2. The method of claim 1 wherein the fibers are paper fibers and the absorbent is one selected from the group of powdered quicklime, powdered hydrated lime, and powdered magnesium oxide.

3. The method of claim 2 wherein the fibers are dry milled waste papers.

4. The method of claim 2 wherein the amount of water in the preliminary mixing step is no more than 150% by weight of the predetermined amount of fibers.

5. The method of claim 2 wherein the amount of water in the preliminary mixing step is within the range of 80% to 100% by weight of the predetermined amount of fibers and the amount of absorbent mixed with the fibers is within the range of up to 3% by weight of the predetermined amount of fibers.

6. The method of claim 2 wherein the amount of water mixed with the fibers during the preliminary mixing step is less than 100% by weight of the predetermined amount of fibers and water is added to the mixed composition in an amount sufficient for the stoichiometric hydration of the calcined gypsum.

7. The method of claim 1 wherein the amount of absorbent mixed with the fibers is within the range of 2 to 10% by weight of the predetermined amount of fibers.

8. The method of claim 1 wherein the predetermined amount of fibers falls within the range of 12% to 35% by weight of the finished board.

9. The method of claim 1 wherein the predetermined amount of fibers falls within the range of 20 to 30% by weight of the finished board.

10. The method of claim 1 wherein the fibers are wood fibers and the moisture of the wood fibers falls within the range of up to 250% by weight of the finished board.

11. The method of claim 1 wherein the amount of water in the preliminary mixing step is within the range of 80% to 100% by weight of the predetermined amount of fibers.

12. The method of claim 1 wherein a sufficient amount of the accelerator additive is added to the composition to reach 80 to 90% of ultimate wet strength within three minutes after the beginning of final mixing followed by compressing the matt.

13. The method of claim 1 wherein the accelerator additive is raw uncalcined gypsum powder.

14. The method of claim 1 wherein the accelerator additive is a mixture of raw gypsum powder and potassium sulfate powder.

15. The method of claim 14 wherein the raw gypsum powder is less than 3% by weight of the dry calcined gypsum and the potassium sulfate powder is less than 1% by weight of the dry calcined gypsum.

16. The method of claim 1 wherein the accelerator additive is added to the dry calcined gypsum.

17. The method of claim 1 wherein the amount of water mixed with the fibers during the preliminary mixing step is less than the amount of water necessary to hydrate the calcined gypsum for optimum strength and wherein the method further comprises the step of adding water onto the matt.

18. The method of claim 17 wherein the step of compressing the matt includes a first degassing step during which the matt is compressed, a second compressing step and a third calibration step during which the matt is held at an intended thickness while the matt sets.

19. The method of claim 18 wherein the step of adding water onto the matt is performed during the degassing step and before the second compressing and third calibration steps.

20. The method of claim 18 wherein the step of adding water onto the matt is performed after the degassing step and before the second compressing and third calibration steps.

21. The method of claim 17 wherein water is added onto the top and bottom surfaces of the matt.

22. The method of claim 17 wherein an accelerator additive is mixed with the water added onto the matt.

23. The method of claim 22 wherein the accelerator additive which is mixed with the water added on the matt is waterglass.

24. The method of claim 1 wherein the absorbent is also capable of softening the fibers, reducing spring back during and after the compression step, and increasing the strength of the finished board.

25. The method of claim 1 which includes forming into a layer the mixture of wetted fibers and absorbent and forming a layer of dry calcined gypsum and wherein in the final mixing step the wetted loose fibers, absorbent, and calcined gypsum are mixed in a vertical mixing operation and immediately deposited onto a moving belt.

26. The method of claim 25 wherein the wetted fibers, absorbent and dry calcined gypsum are mixed in the vertical mixing operation by a plurality of spiked disk mixing rollers which permit a uniform dispensing of the wetted fibers without the formation of wetted fiber balls and a plurality of turbulence disks which engage the spiked disks vertically to keep the spiked disks clean.

27. The method of claim 25 wherein the wetted fibers, absorbent and dry calcined gypsum are mixed in the vertical mixing operation by a plurality of spiked disk mixing rollers which permit a uniform dispensing of the wetted fibers without the formation of wetted fiber balls and a plurality of turbulence disks which engage the spiked disks at a right angle to keep the spiked disks clean.

28. The method of claim 1 wherein the wetted fibers and absorbent are mixed with the dry, calcined gypsum by a plurality of rotary wheels.

29. The method of claim 1 wherein the preliminary mixing step includes the steps of placing materials from which the fibers are to be produced into a rotary mill, subjecting the material to rotary elements which interact with the materials and create a turbulent environment in which the materials fraction to decreasing size, forming the fibers from the materials and spraying water onto the fibers.

30. The method of claim 29 wherein the rotary mill is a turbo mill having one or more spray nozzles for spraying water into the turbo mill.

31. The method of claim 1 wherein the preliminary mixing step includes placing materials from which fibers are to be produced into a wing beater mill, forming the fibers from the materials and passing the fibers through a screen in which the fiber fraction to decreasing size, the wing beater mill having one or more spray nozzles proximate its outlet for spraying water onto the fibers.

32. The method of claim 1 wherein said wetted fibers and absorbent are initially layered onto a conveyor to form a first layer, the gypsum is deposited as a layer over the first layer to form a second layer and the layers are introduced into a vertical mixer which thoroughly mixes the wetted fibers, absorbent and gypsum into a homogeneous composition.

33. The method of claim 1 wherein a binder is added to one of the wetted fibers, gypsum and water.

34. The method of claim 33 wherein the binder is starch added as a powder to the dry calcined gypsum.

35. The method of claim 1 wherein the step of compressing the matt includes compressing the matt between a pair of conveyor belts.

36. The method of claim 1 wherein the step of compressing the matt includes compressing the matt in a roller press between a pair of conveyor belts.

37. The method of claim 1 wherein chemicals and coatings are applied to the matt prior to the drying step and drier heat is used to cure the chemicals and impart to the fiber gypsum board properties of additional water resistance, strength, and color.

38. The method of claim 1 wherein the absorbent is a mixture of different absorbents.

39. The method of claim 1 wherein the absorbent is a mixture of lime and fine milled raw gypsum.

40. The method of claim 1 wherein the absorbent is a mixture of lime and fine milled waste of dryboard.

41. The method of claim 1 wherein the absorbent is a mixture of absorbents and chemicals capable of softening the fibers and also at least one of increasing the strength of the board and accelerating the setting time and hydration of the dry calcined gypsum.

42. The method of claim 1 wherein the absorbent is fast-reacting CaO.

43. The method of claim 42 wherein chemicals are added to the absorbent and are selected from the group of acidic and alkaline solids in a wet phase.

44. The method of claim 42 wherein solid powdered sodium silicate is added to the absorbent.

45. The method of claim 1 wherein the fibers are waste paper fibers and substantially all of the waste paper fibers are sized by screen less than 2,000 microns and wherein the absorbent is CaO having at least 50% of the particles being less than 32 microns and with less than 4% of the particles being larger than 100 microns.

46. The method of claim 1 wherein the absorbent is lime, the fibers are paper fibers and the amount of lime mixed with the paper fibers is within the range of up to 5% by weight of the predetermined amount of fibers.

47. A method of producing gypsum fiber board comprising the steps of:
mixing in a preliminary mixing step a predetermined amount of fibers, an absorbent for restricting the adhesion of the fibers to one another to inhibit balling of the fibers, and water to form a mixture of wetted, loose fibers and absorbent;
mixing in a mixing step the wetted fibers and absorbent with a predetermined amount of dry calcined gypsum to form a mixed composition;
wherein an accelerator is premixed with one of the dry calcined gypsum, fibers and water;
promptly laying the mixed composition of wetted fibers, absorbent, gypsum and accelerator into a matt;
promptly degassing the matt in a first compression step;
adding water to the matt after degassing;
immediately compressing the matt after adding the water to the matt to an intended thickness to form a board composed of bonded fibers and gypsum.

48. The method of claim 47 wherein the fibers are absorbent fibers.

49. The method of claim 48 wherein the water in the preliminary mixing step and the water added to the matt is one of a dispersion, dilution and solution of chemicals capable of softening the fibers and also at least one of increasing the strength of the board and accelerating setting time and hydration of the dry calcined gypsum.

50. The method of claim 49 wherein the chemicals added to the water are selected from the group of acidic and alkaline liquids.

51. The method of claim 49 wherein a chemical added to the water is $H_2SO_4$.

52. The method of claim 47 in which the step of premixing the accelerator comprises premixing the accelerator with the dry calcined gypsum as powders.

53. The method of claim 41 which includes dispensing an additional accelerator with water onto the matt after the degassing step.

54. A method of producing gypsum fiber board comprising the steps of:
mixing a predetermined amount of fibers, an absorbent restricting the adhesion of the fibers to one another to inhibit balling of the fibers, and water to prepare a supply of wetted loose fibers and absorbent;
mixing a supply of the wetted loose fibers and absorbent with a predetermined amount of dry calcined gypsum to form a first composition;
wherein an accelerator additive is added to one of the fibers, absorbent, water and gypsum to speed the setting of the gypsum of the first composition;
layering the first composition into a first matt layer having a substantially uniform consistency;
mixing a low density porous particle material with water to form a supply of wetted low density particles;
mixing the wetted low density porous particles with a predetermined amount of dry gypsum to form a second composition;
layering the second composition over the first matt layer to form a second layer having a substantially uniform consistency;
mixing a supply of wetted loose fibers with a predetermined amount of dry calcined gypsum to form a third composition;
layering the third composition over the second layer to form a third layer having a substantially uniform consistency;
compressing the three layers to form a board; and
drying the board to provide a finished board of substantially uniform density.

55. The method of claim 54 in which the mixing of the low density porous particle material with water includes the step of mixing an adhesive with the low density porous particles.

56. The method of claim 54 in which the mixing of the low density porous particle material with water includes the step of mixing one of the group of dry fibers and wetted fibers with the wetted low density particles.

57. The method of claim 54 wherein a supply of wetted fibers are mixed with the low density particles.

58. A method of producing a composite board comprising the steps of:
mixing in a preliminary mixing step a predetermined amount of fibers, an absorbent for restricting the adhesion of the fibers to one another to inhibit balling of the fibers, and water to form a mixture of wetted, loose fibers and absorbent wherein the mixture has a fluffy consistency;
mixing the wetted fibers and absorbent with an amount of dry gypsum sufficient to form a composition in which substantially all of the water in the wetted fibers will chemically react with said gypsum to hydrate said gypsum;
wherein an accelerator additive is added to one of the fibers, water and gypsum to speed the setting of the gypsum of the composition;
coating at least one surface of a wood substrate with a bonding agent; and
depositing a layer of the composition over the coated surface of the wood substrate to form a matt on the coated surface of the wood substrate.

59. The method of claim 58 wherein the fibers are paper fibers and the amount of water added to the fibers is approximately 25–50% of the weight of the gypsum.

60. The method of claim 58 wherein the fibers include fiberglass fibers.

61. The method of claim 58 wherein the step of mixing a predetermined amount of wetted fibers and water includes the steps of placing material from which the fibers are produced into a rotary mill, subjecting the material to rotary elements which interact with the material and create a turbulent environment in which the material fractionates into fibers of decreasing size, and spraying water into the rotary mill.

62. The method of claim 58 wherein said wetted fibers and absorbent are mixed with starch and said dry gypsum by a plurality of rotary pinwheels.

63. The method of claim 58 wherein said wetted fibers and absorbent are initially layered onto a conveyor to form a first layer, the gypsum is deposited over the first layer to form a second layer, and the layers are introduced into a mixer having at least one pinwheel for thoroughly mixing the wetted fibers, absorbent and gypsum into a homogeneous composition.

64. The method of claim 63 wherein powdered starch is also introduced into the mixer and wetted fibers, absorbent, gypsum and starch are thoroughly mixed into a homogeneous composition by the mixer.

65. The method of claim 63 wherein the absorbent is hydrated lime.

66. The method of claim 63 wherein said accelerator additive is selected from the group consisting of potassium sulfate and raw uncalcined gypsum powder.

67. The method of claim 58 further comprising the step of compressing and drying the matt.

68. The method of claim 67 wherein the step of compressing the matt includes the step of compressing the matt between a pair of conveyor belts.

69. The method of claim 67 wherein the matt is compressed between the conveyor belts for a period of at least fifteen minutes.

70. The method of claim 69 wherein the conveyor belts are selectively moved toward or away from each other to selectively vary the pressure applied to the matt.

71. A method of producing a composite board comprising the steps of:

mixing in a preliminary mixing step a predetermined amount of fibers, an absorbent for restricting the adhesion of the fibers to one another to inhibit balling of the fibers, and water to form a mixture of wetted, loose fibers and absorbent wherein the mixture has a fluffy consistency;

mixing the wetted fibers and absorbent with an amount of dry gypsum and starch sufficient to form a composition in which substantially all of the water in the wetted fibers will chemically react with said gypsum and starch to hydrate said gypsum;

wherein an accelerator additive is added to one of the fibers, water, and gypsum to speed the setting of the gypsum of the composition;

coating at least one surface of a wood substrate with a bonding agent; and depositing a layer of the composition over the coated surface of the wood substrate.

72. A method of producing a composite board comprising the steps of:

mixing in a preliminary mixing step a predetermined amount of fibers, an absorbent for restricting the adhesion of the fibers to one another to inhibit balling of the fibers, and water to form a mixture of wetted, loose fibers and absorbent;

mixing in a final mixing step the wetted fibers with a predetermined amount of dry calcined gypsum to form a mixed composition;

wherein an accelerator additive is added to one of the fibers, absorbent, water and gypsum to speed the setting of the gypsum of the mixed composition;

coating at least one surface of a wood substrate with a bonding agent; and depositing a layer of the mixed composition over the coated surface of the wood substrate.

* * * * *